Figure 7:
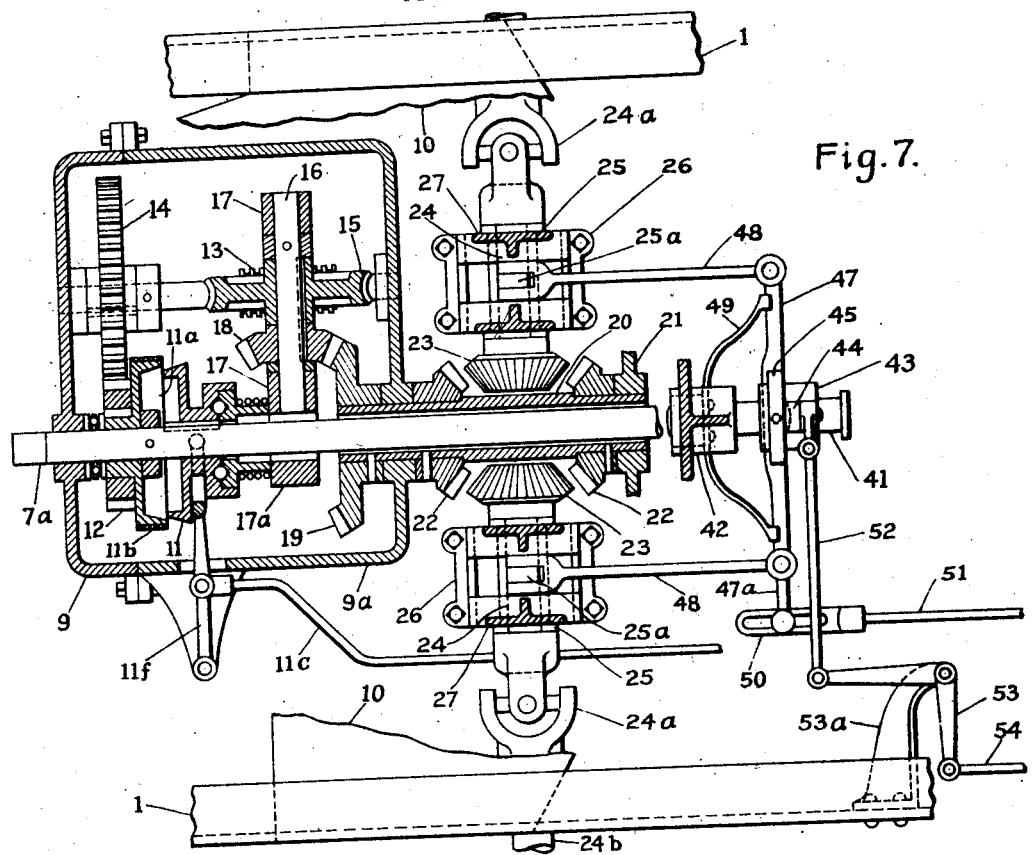

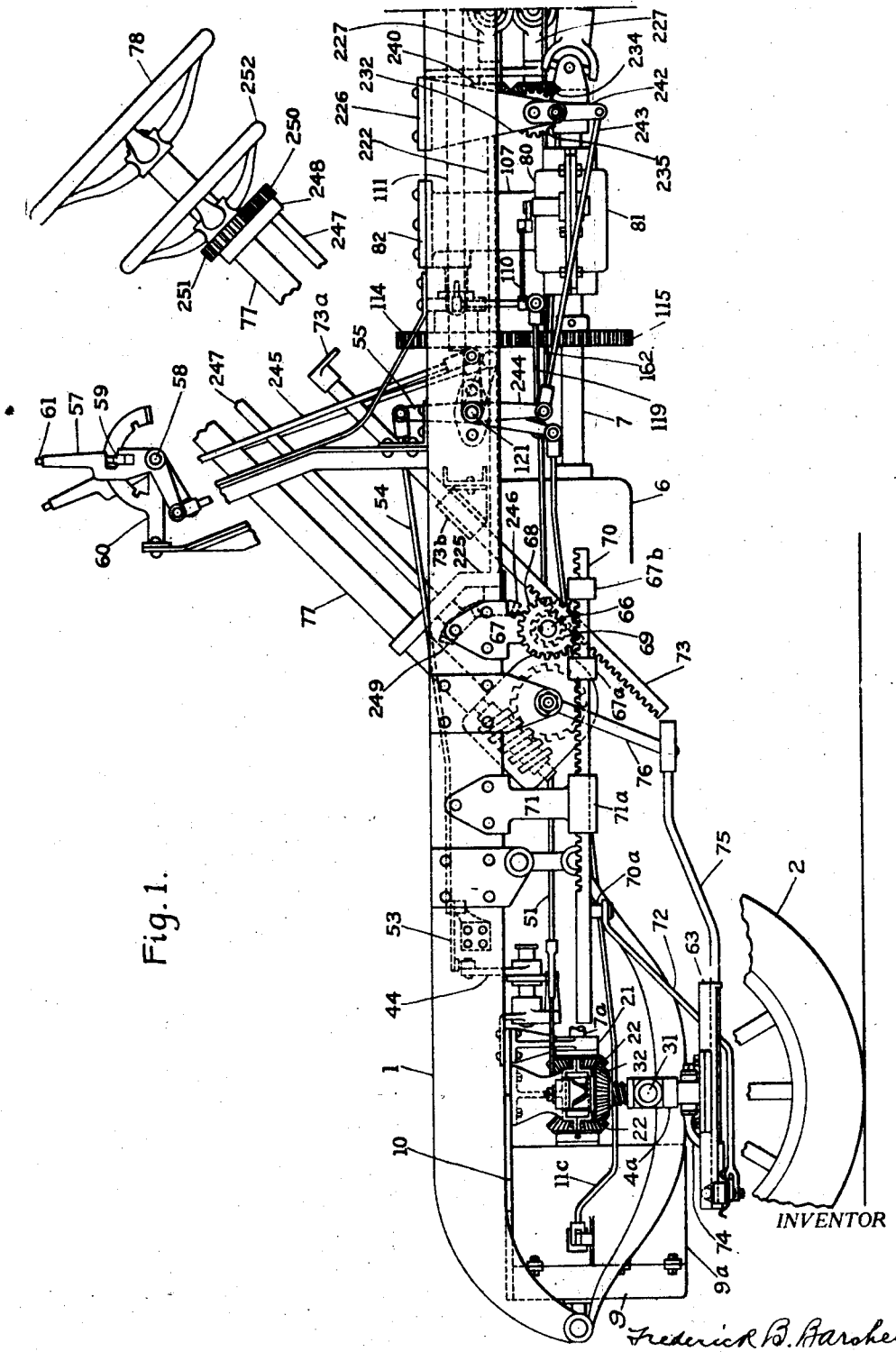

Feb. 19, 1929.
F. B. BARSHELL
1,703,070
AUXILIARY TRACTION AND STEERING DEVICE FOR MOTOR VEHICLES
Filed Feb. 1, 1923     23 Sheets-Sheet 2
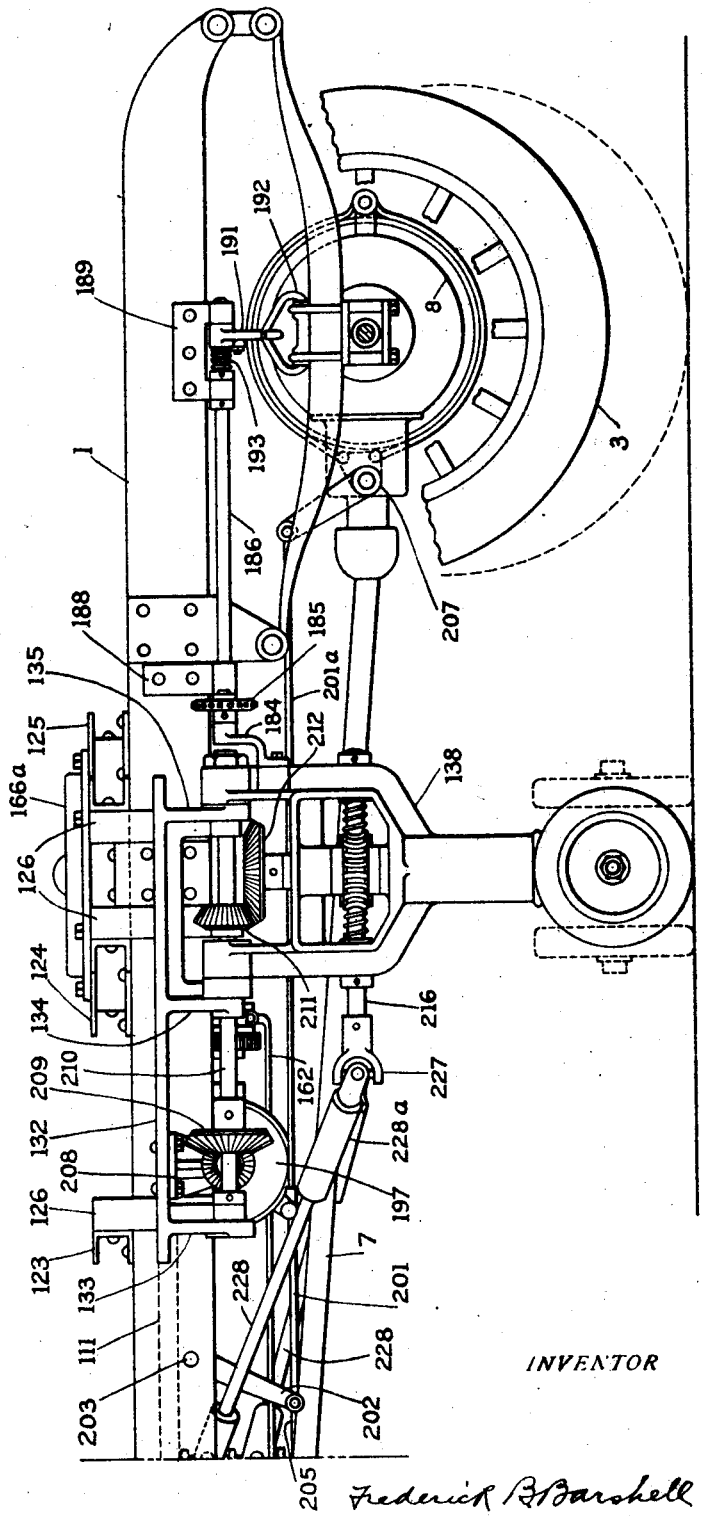
Fig. 1-A.
INVENTOR
Frederick B Barshell

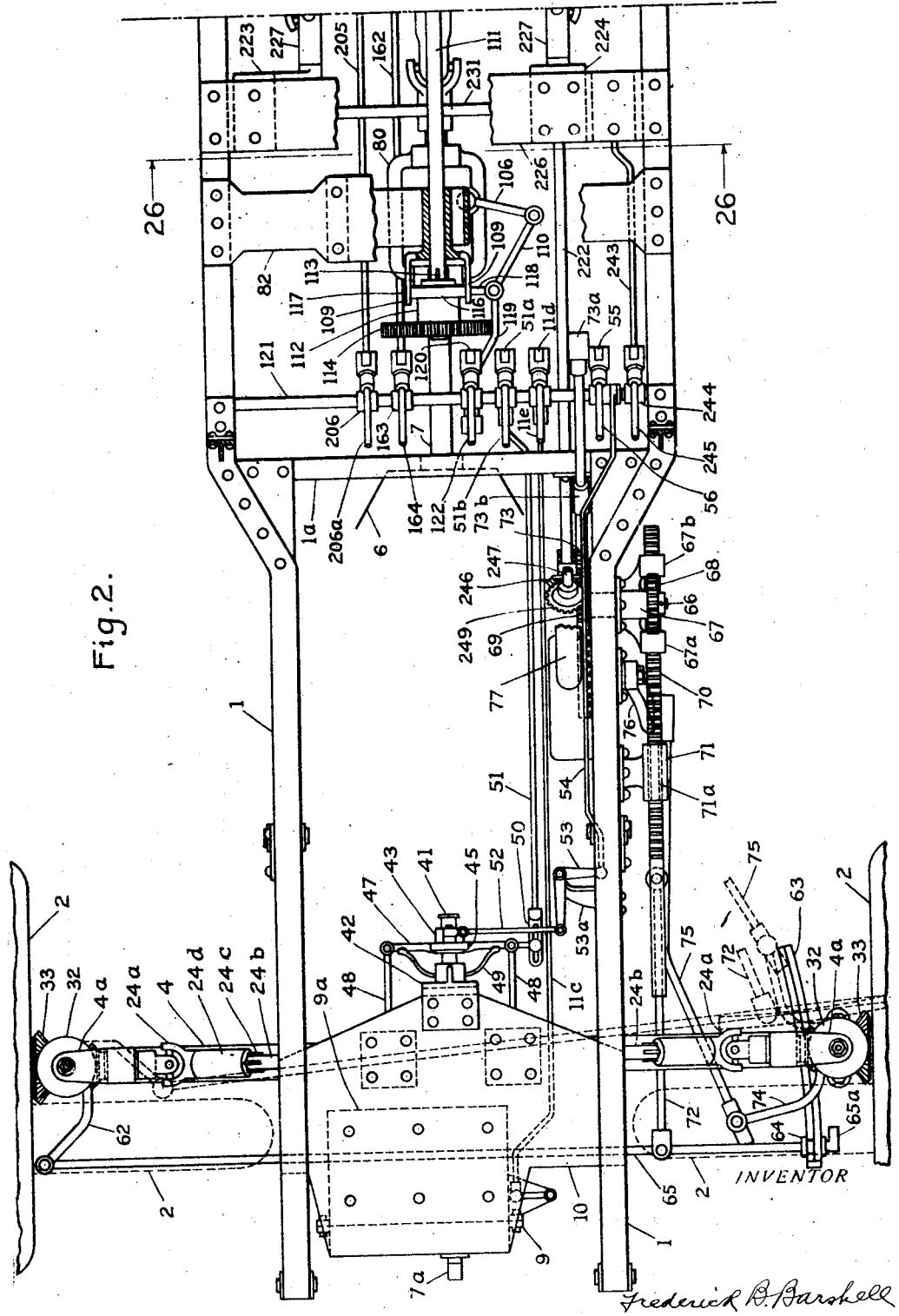

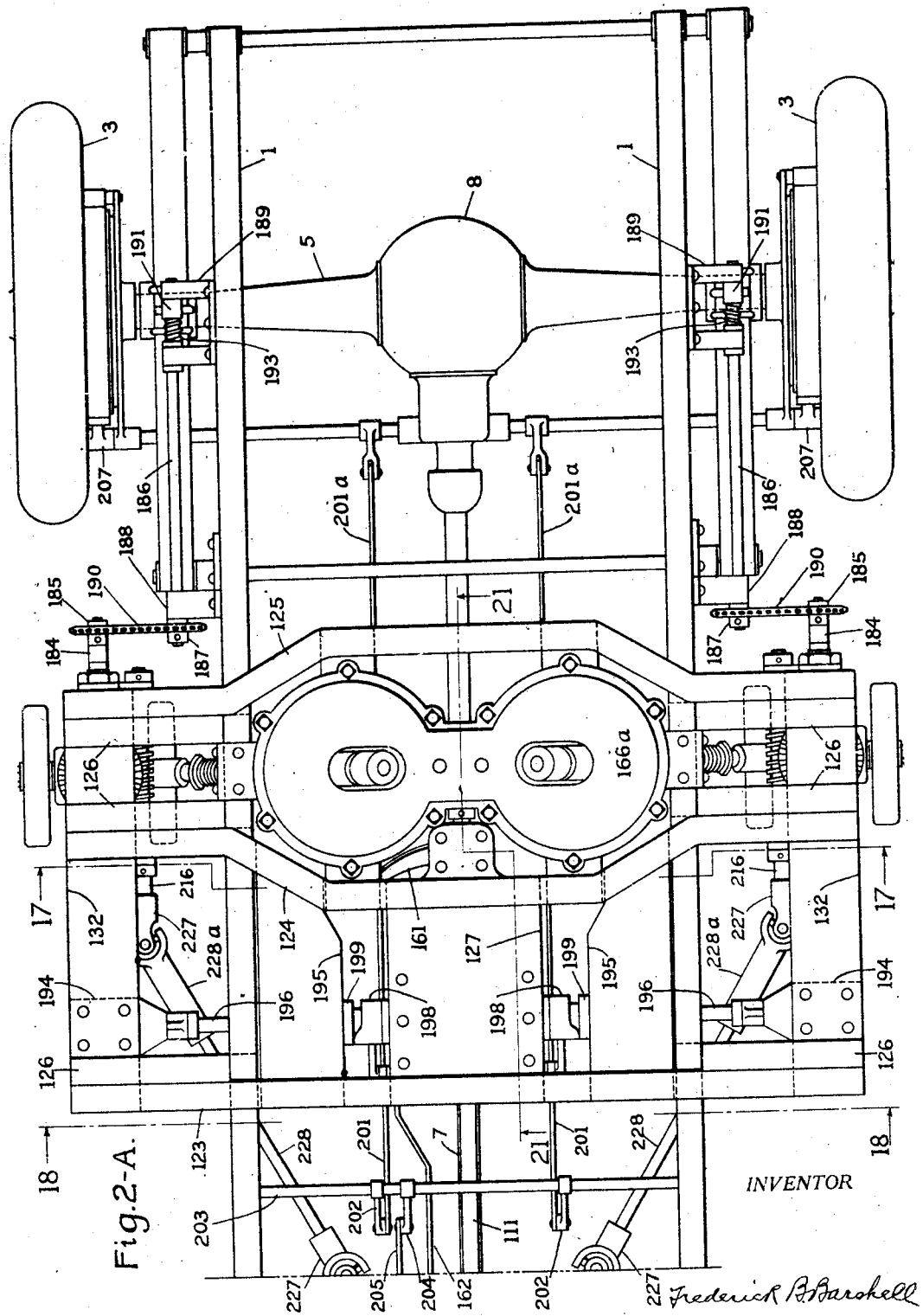

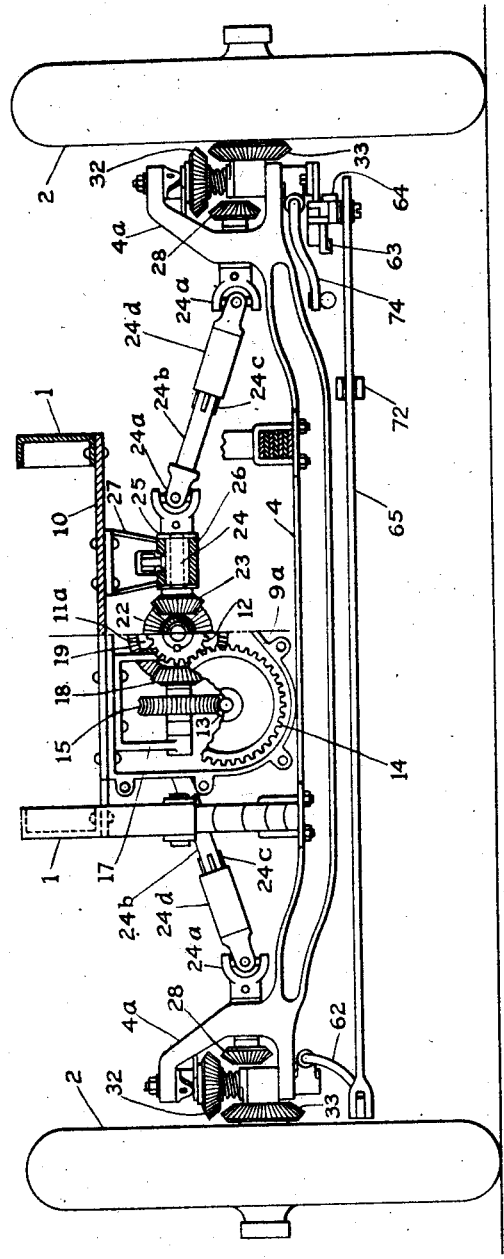

Feb. 19, 1929.  F. B. BARSHELL  1,703,070
AUXILIARY TRACTION AND STEERING DEVICE FOR MOTOR VEHICLES
Filed Feb. 1, 1923   23 Sheets-Sheet 6

INVENTOR
Frederick B. Barshell

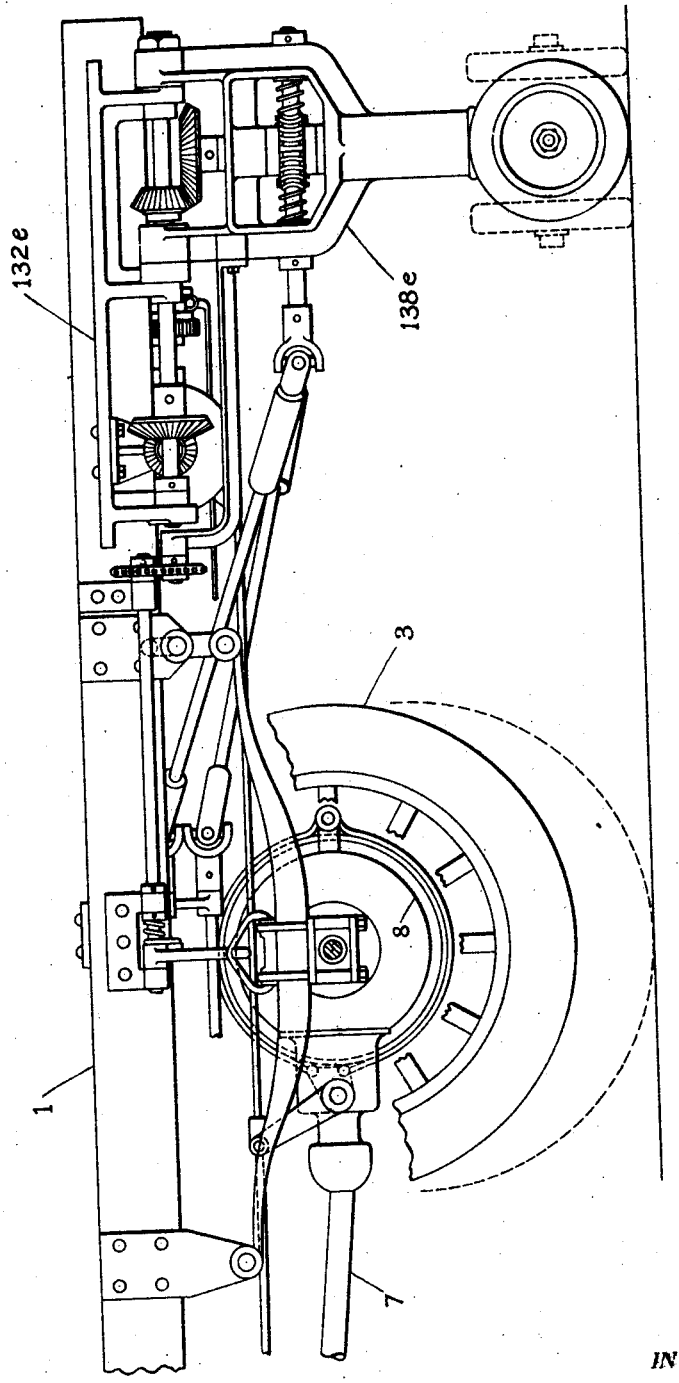

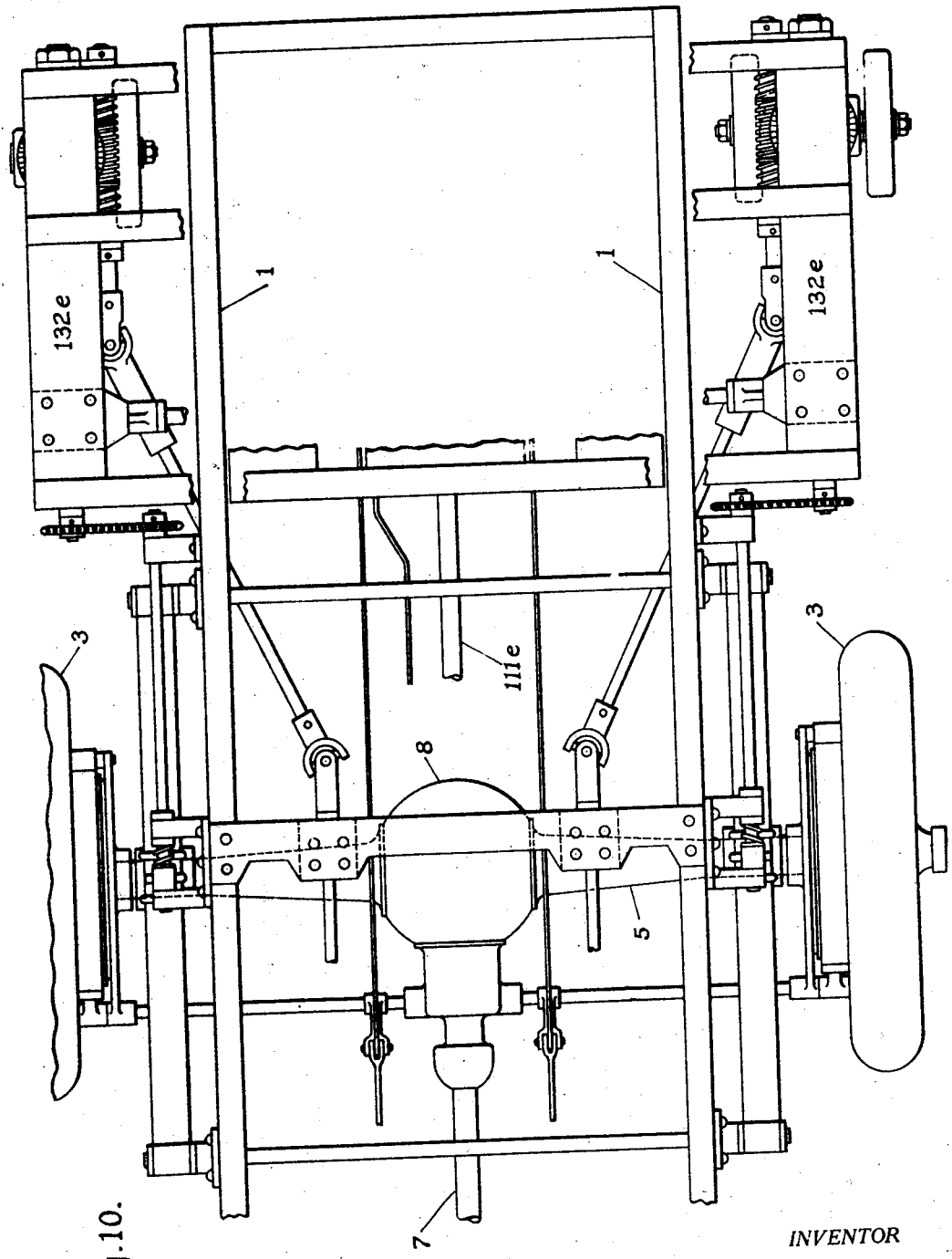

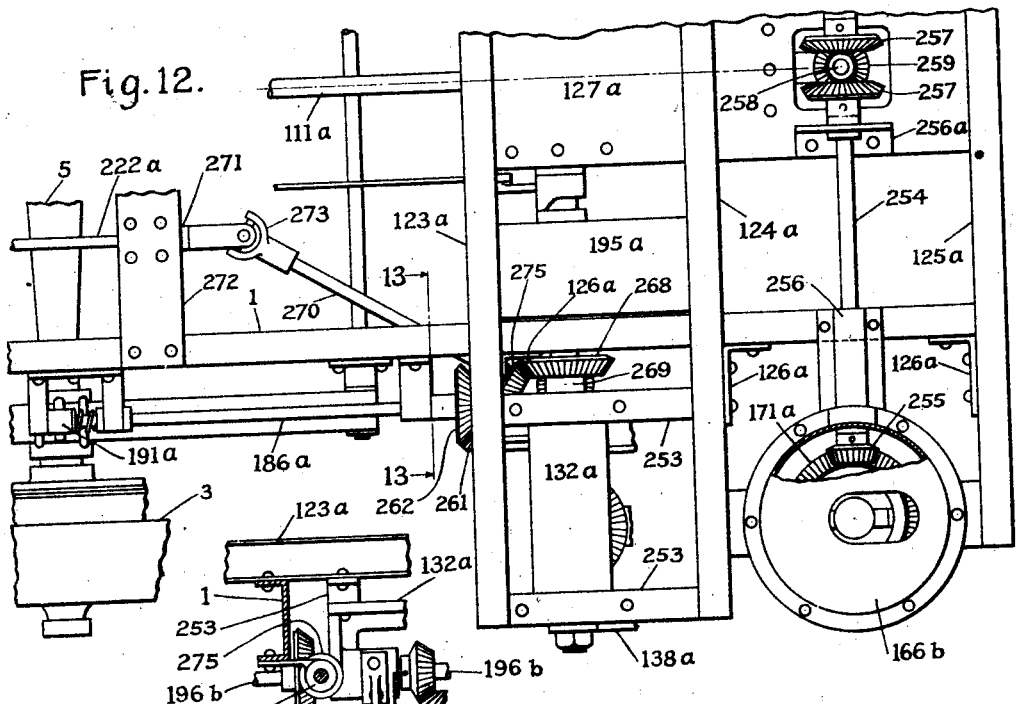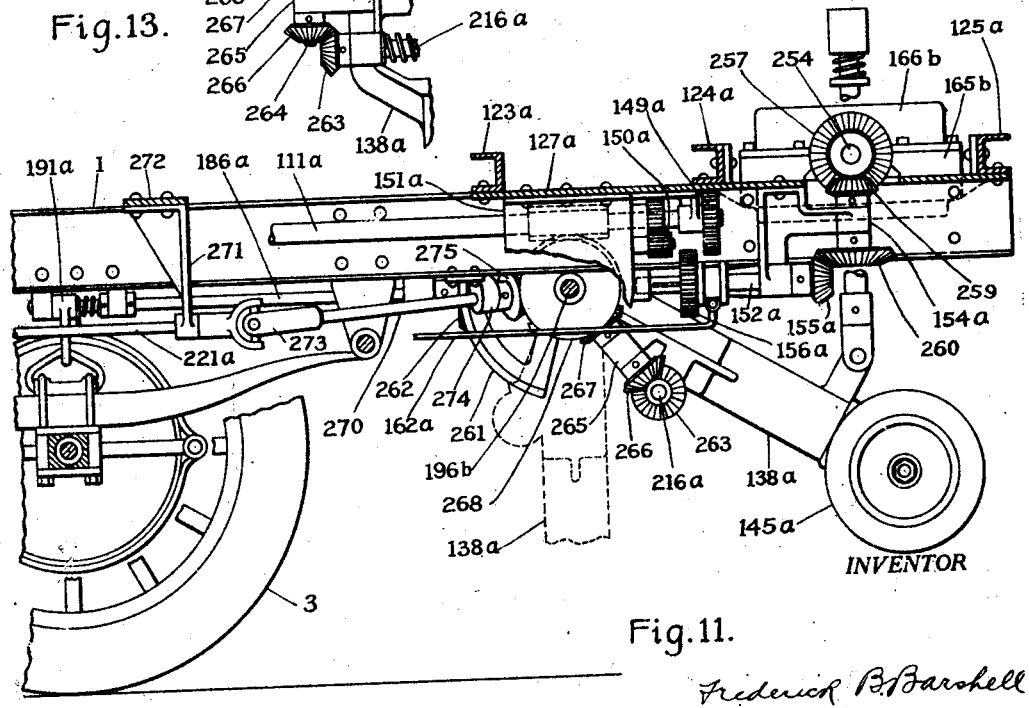

Feb. 19, 1929.  1,703,070
F. B. BARSHELL
AUXILIARY TRACTION AND STEERING DEVICE FOR MOTOR VEHICLES
Filed Feb. 1, 1923   23 Sheets-Sheet 10
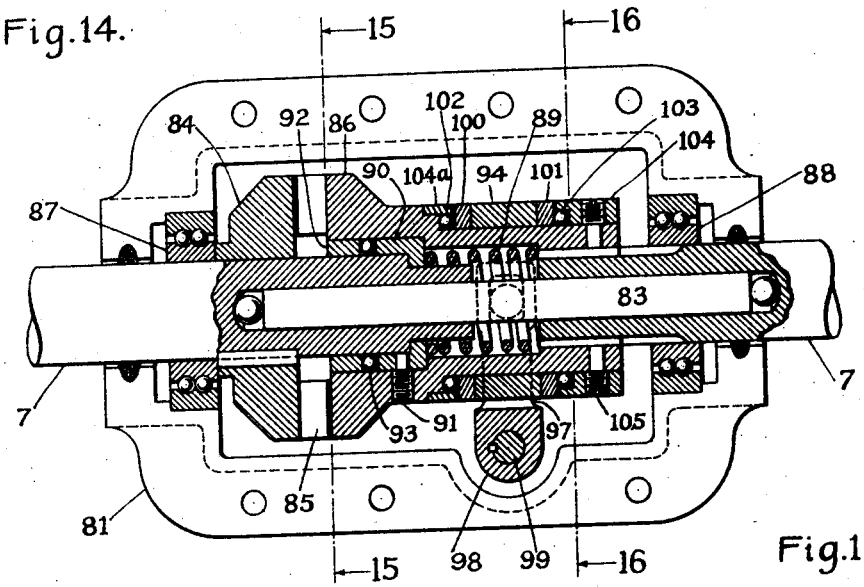
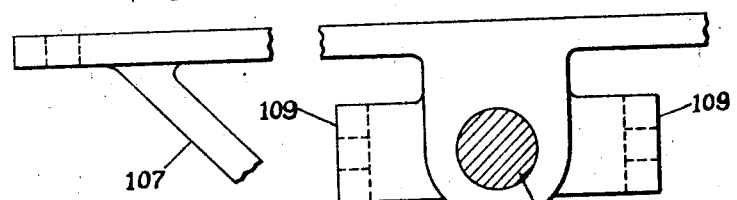
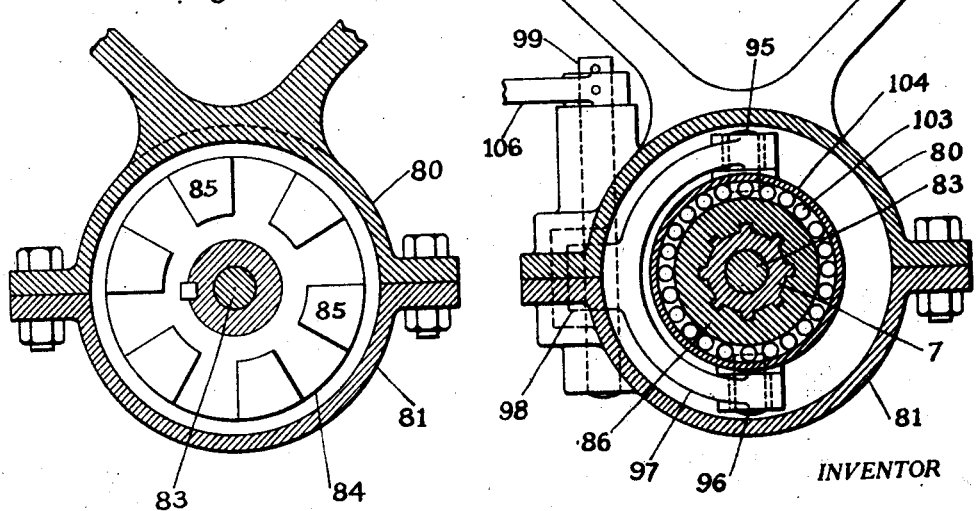
INVENTOR
Frederick B. Barshell Feb. 19, 1929.　　F. B. BARSHELL　　1,703,070
AUXILIARY TRACTION AND STEERING DEVICE FOR MOTOR VEHICLES
Filed Feb. 1, 1923　　23 Sheets-Sheet 12
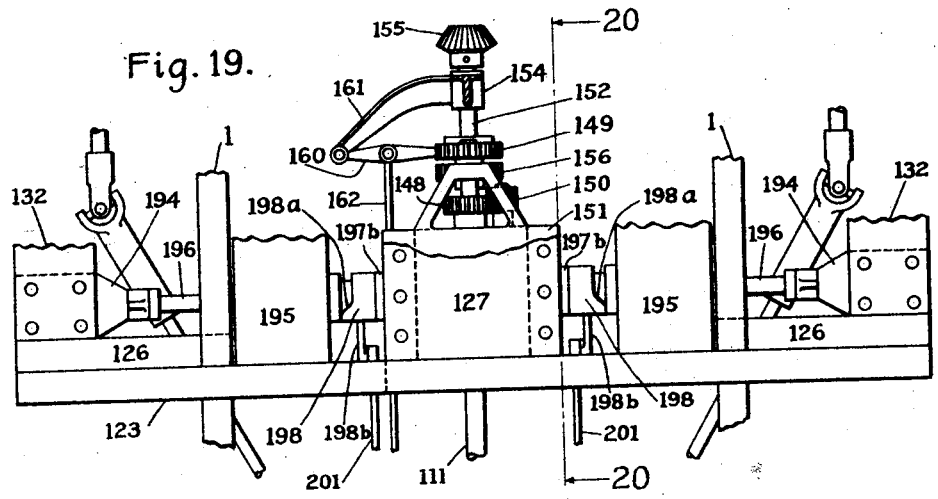
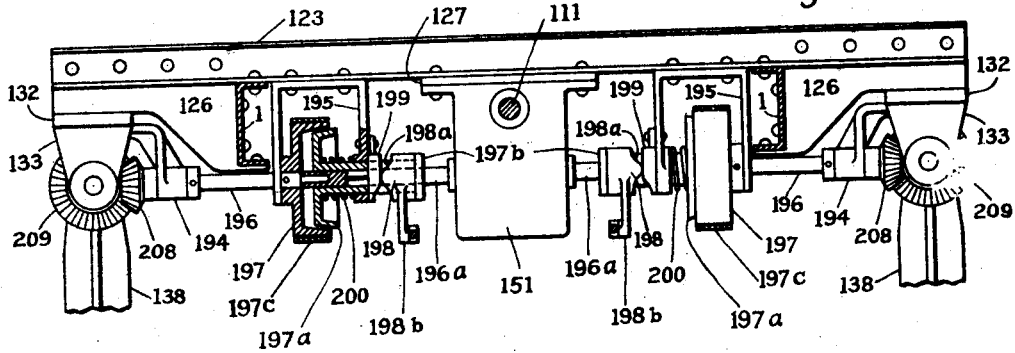
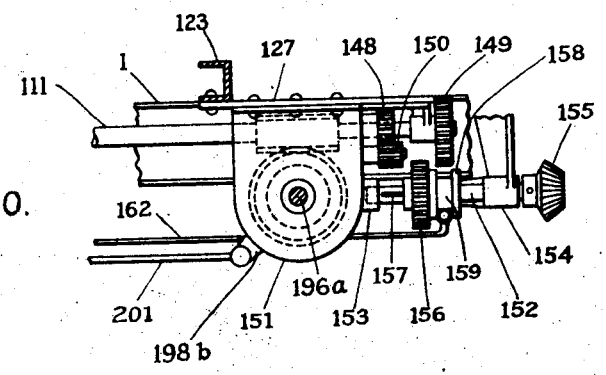
INVENTOR
Frederick B. Barshell

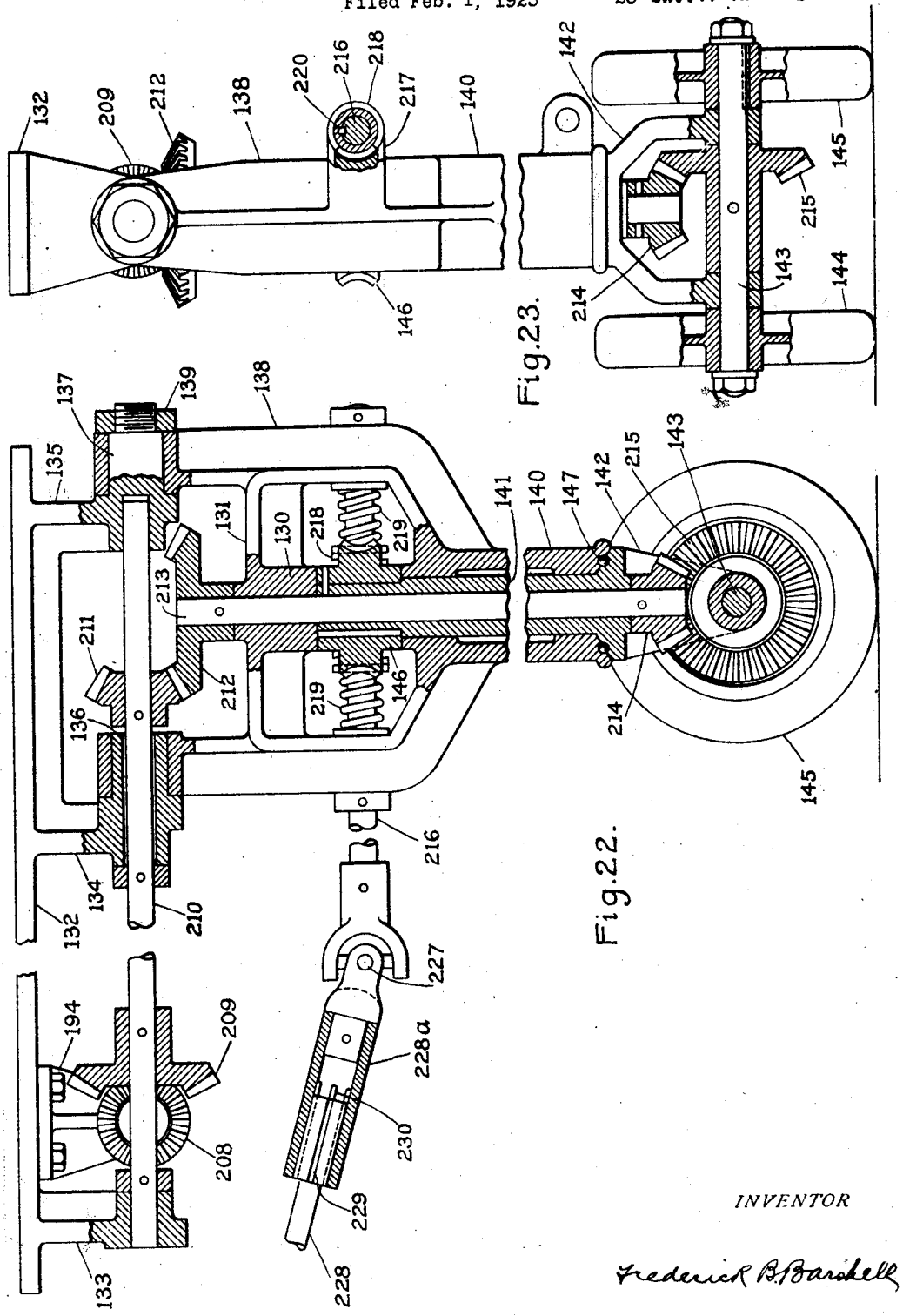

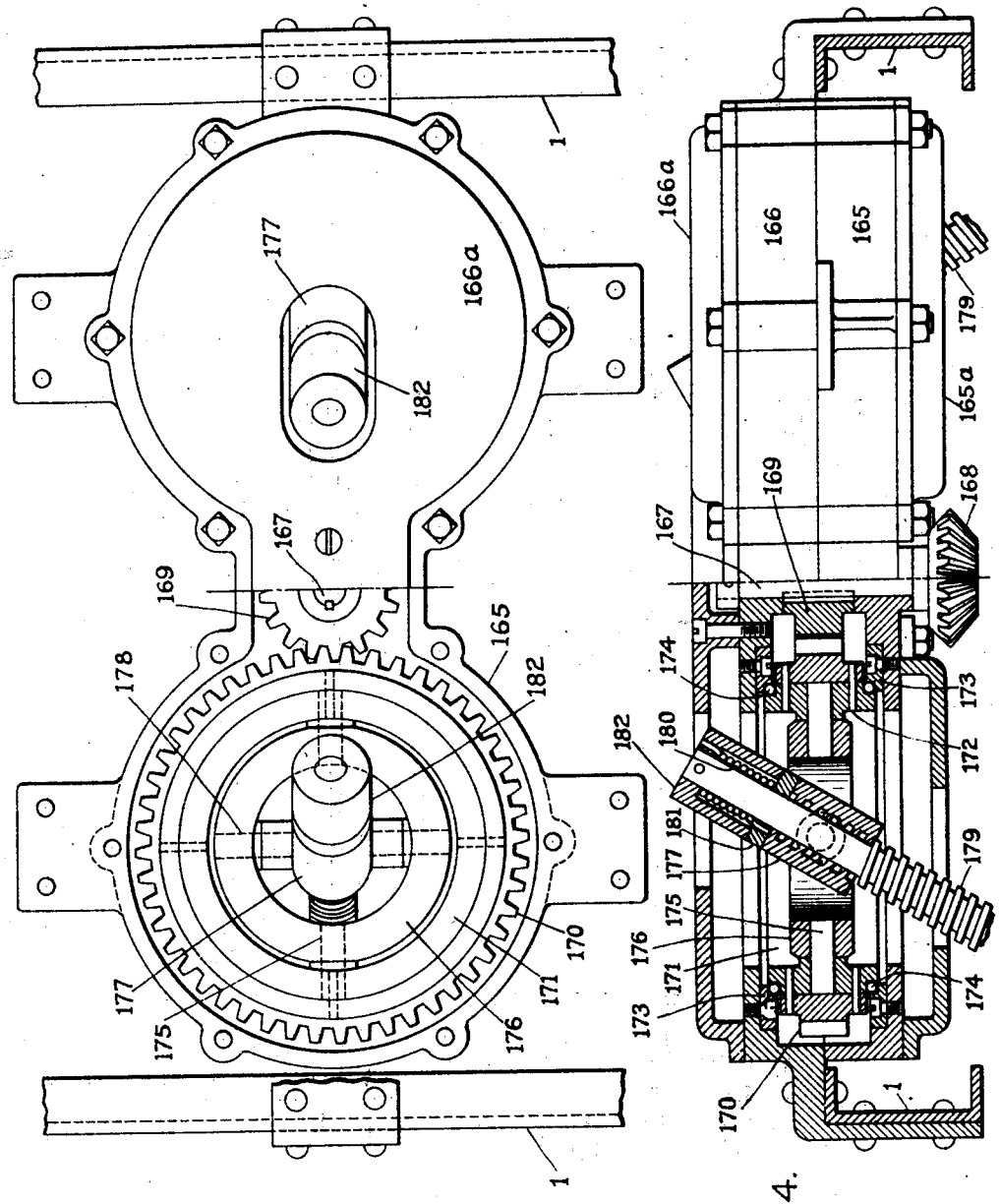

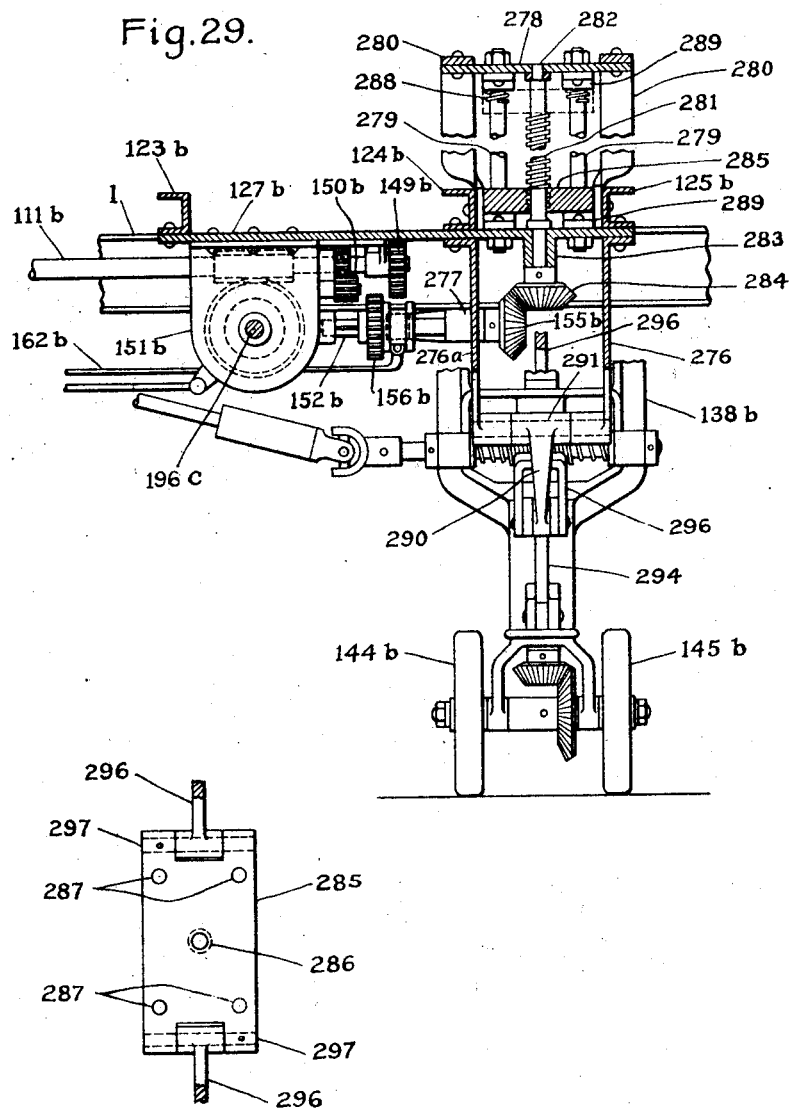

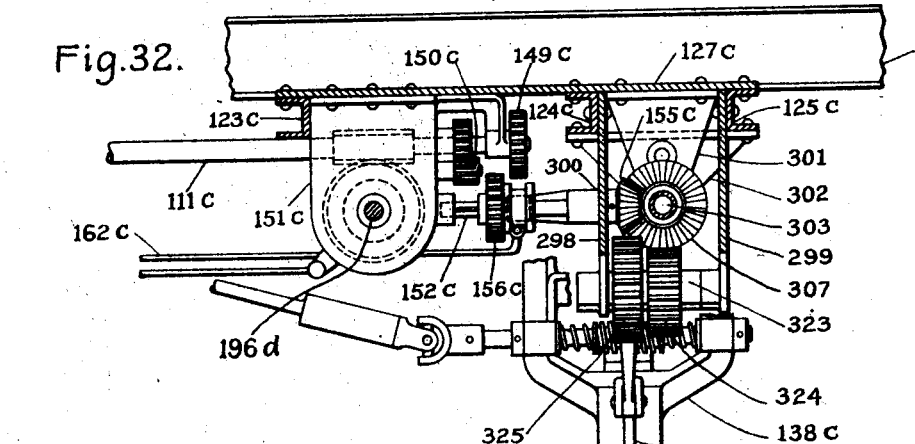
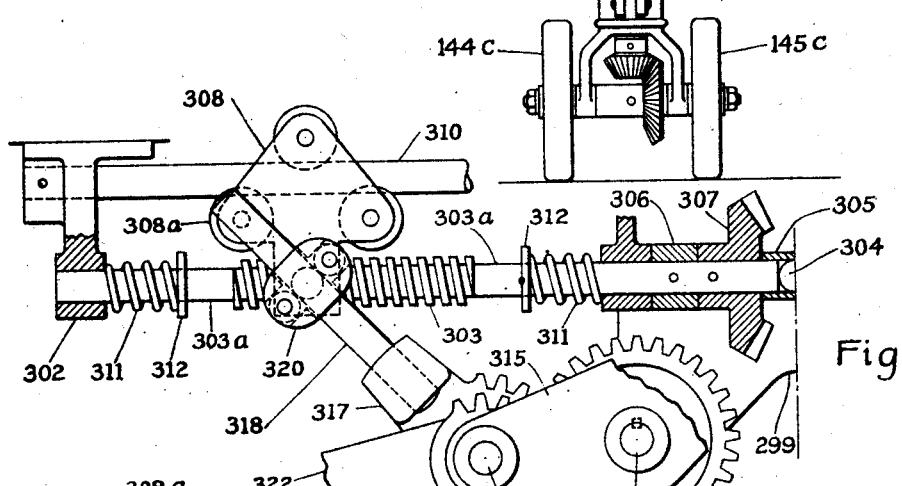
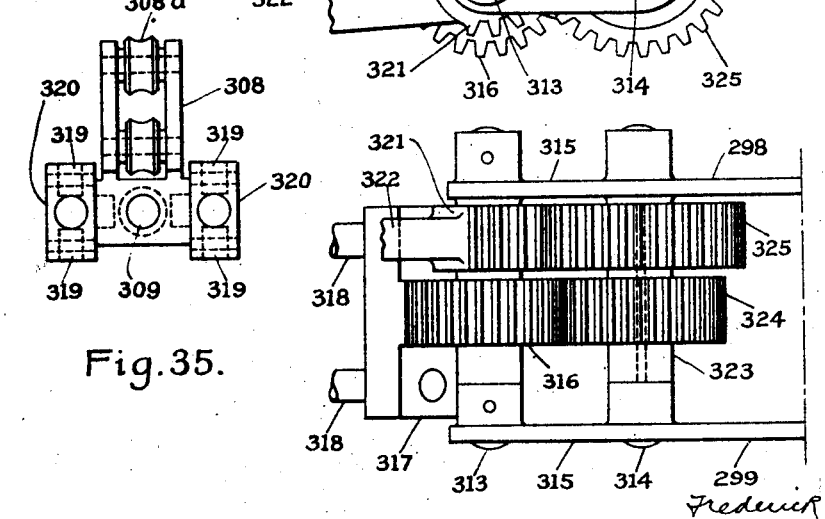

Feb. 19, 1929.  1,703,070
F. B. BARSHELL
AUXILIARY TRACTION AND STEERING DEVICE FOR MOTOR VEHICLES
Filed Feb. 1, 1923  23 Sheets-Sheet 21

INVENTOR
Frederick B. Barshell

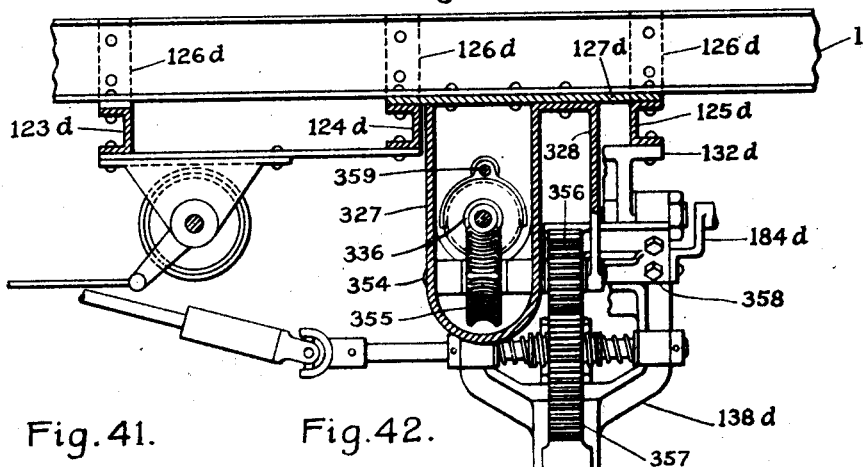
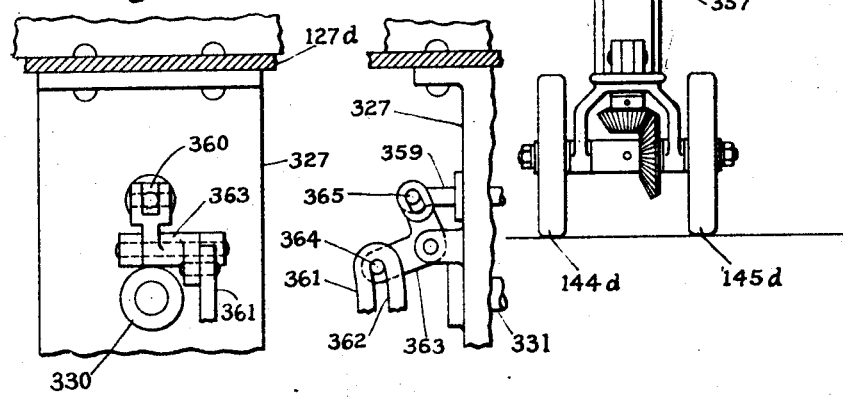
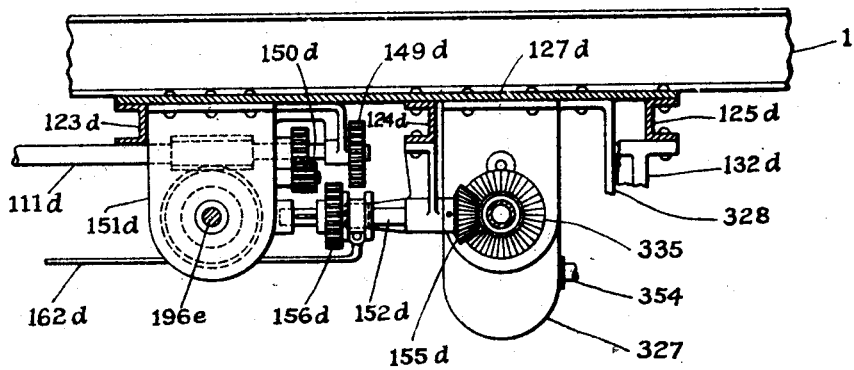

Feb. 19, 1929. 1,703,070
F. B. BARSHELL
AUXILIARY TRACTION AND STEERING DEVICE FOR MOTOR VEHICLES
Filed Feb. 1, 1923  23 Sheets-Sheet 23
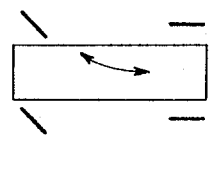
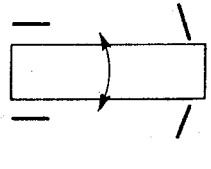
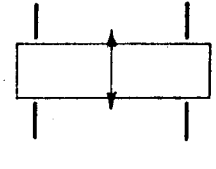
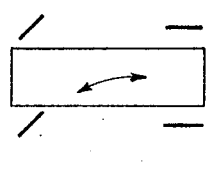
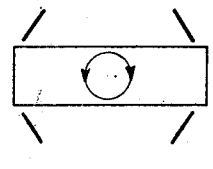
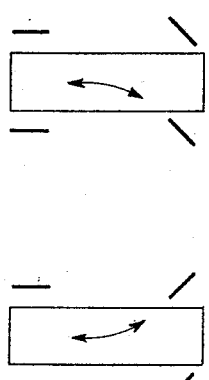
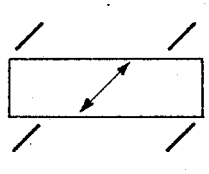
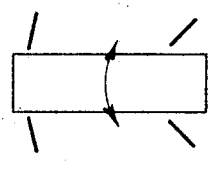
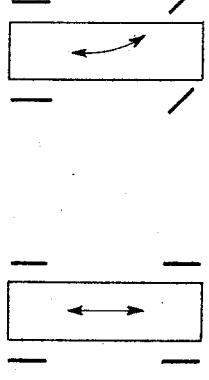
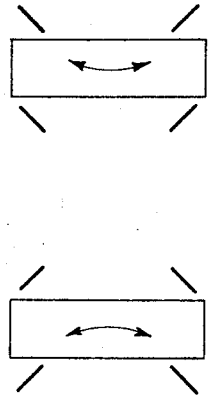
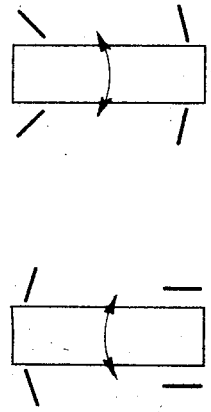
*INVENTOR*
Frederick B. Barshell Patented Feb. 19, 1929.

1,703,070

UNITED STATES PATENT OFFICE.

FREDERICK B. BARSHELL, OF NEW YORK, N. Y., ASSIGNOR OF ONE-HALF TO DAVID BARSHELL, OF NEW YORK, N. Y.

AUXILIARY TRACTION AND STEERING DEVICE FOR MOTOR VEHICLES.

Application filed February 1, 1923. Serial No. 616,423.

This invention, which generally has reference to vehicles, primarily has for its purpose to provide an improved construction of motor driven vehicles, that are of a comparatively simple character, embodying an improved construction of running gear providing simple and efficient traction elements together with improved power transmission and steering mechanisms with means for operating the same; all operative parts are easily controlled and so adapted, as will permit the vehicle by the use of its running gear to be moved angularly and transitionally in all directions directly from a state of rest in addition to possessing such other facility and flexibility for tractive movement as will be hereinafter more specifically shown and stated.

A further object of the invention is to provide a construction of running gear with power transmission and steering mechanism for automobiles or similar vehicles, that will give it adaptability for use as auxiliary or supplementary running gear with its attendant features for universal and other varied tractive movement aforementioned. That provision embodies traction elements so mounted on the vehicle as to bring them from a state of inoperative position to an operative position, (that is, to bring said traction elements mounted in the frame from a state of disengagement into engagement with the road surface) and conversely also, to bring them back to the former inoperative position, with means to throw the same into and out of action at the will of the operator. A variety of types of the auxiliary device are hereinafter shown and described, each having special adaptability varying with the type of vehicle used. In its broader application and with slight modification the running gear may be made to operate and be in permanent engagement with the road surface with its attendant facility and flexibility for travel.

Another object of the invention is the provision of two improved types of steering mechanism for steering the vehicle. In one type a rotatably mounted mechanism operates to steer the wheels grouped preferably in pairs, at any angle in unison in like direction or, to steer the wheels in unison at any angle to each other, convergent or divergent, for directing the line of travel at the will of the operator. The other type of steering mechanism effects a like action of the coacting steering wheels by the use of a lever control mechanism; each types of said steering mechanisms having its special adaptability for use on vehicles.

Another object is to provide an improved power transmission device for use as a front driving mechanism, which will permit the driving wheels of the automomile to be used also as steering wheels thereof and that will permit the driving connection with said wheels to be operably brought into or out of operative engagement.

The mechanism, illustrated and described herein in connection with the driving and steering of the front pair of wheels and apart from the supplementary traction devices, forms the subject matter of my divisional application, Serial #136,116, filed September 17, 1926.

Other objects and advantages of my improved construction will be apparent from the following description taken in connection with the accompanying drawings.

That the details of the structure, the practical application of my running and of my power transmitting and steering mechanism may be fully understood and their different adjustments for directing the line of travel of the vehicle, clearly set forth, I have illustrated my improved motor vehicle in one of the varied structural aspects in its operative shape, it being understood, that I may make any changes in the specific construction here-in shown and described within the scope of the claims and with out departing from or exceeding the spirit of the invention.

Certain of the matter described and shown herein but not claimed forms the subject matter of my co-pending and divisional application Serial #136,116, filed September 17, 1926.

Figure 8:
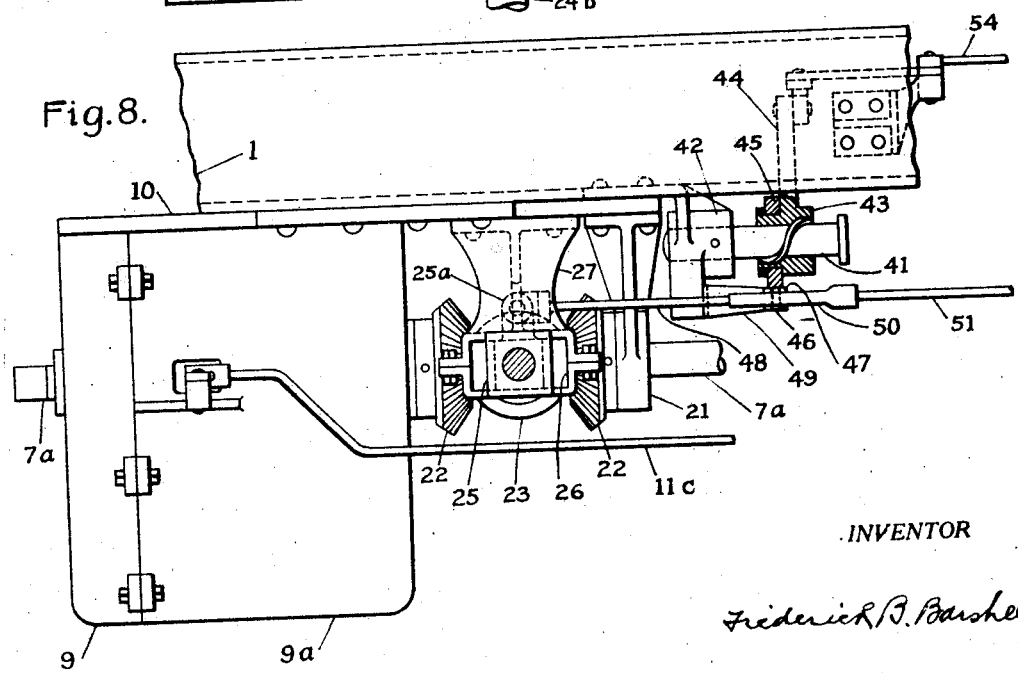
Figure 17:
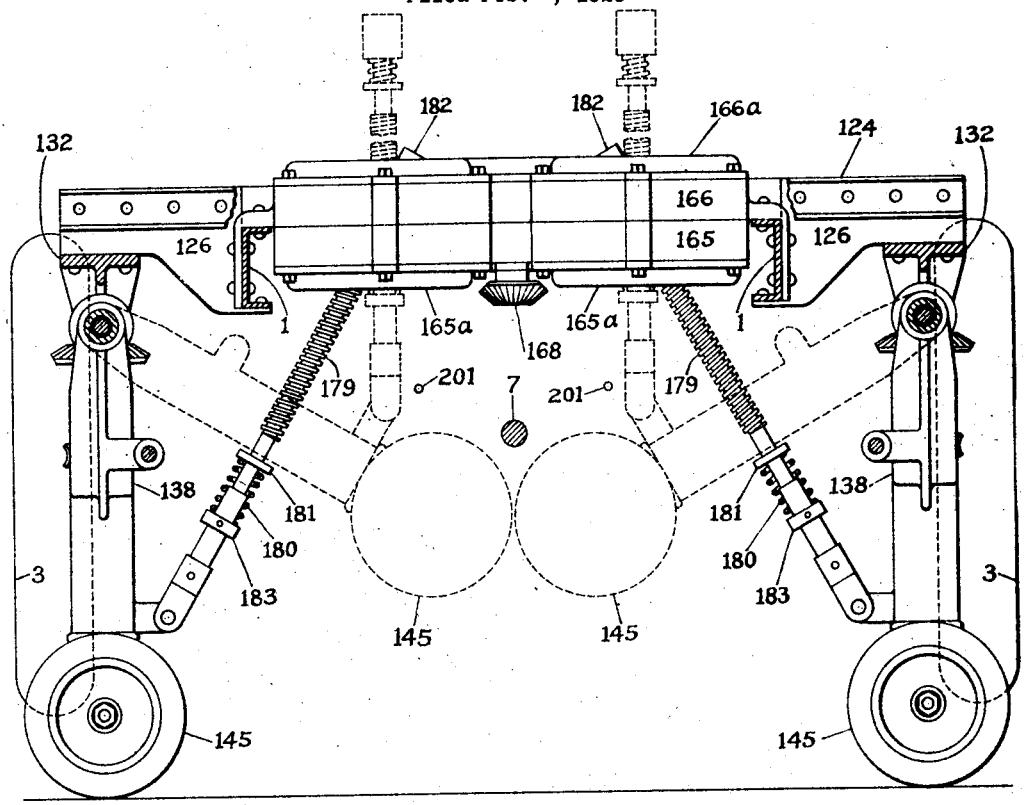
Figure 21:
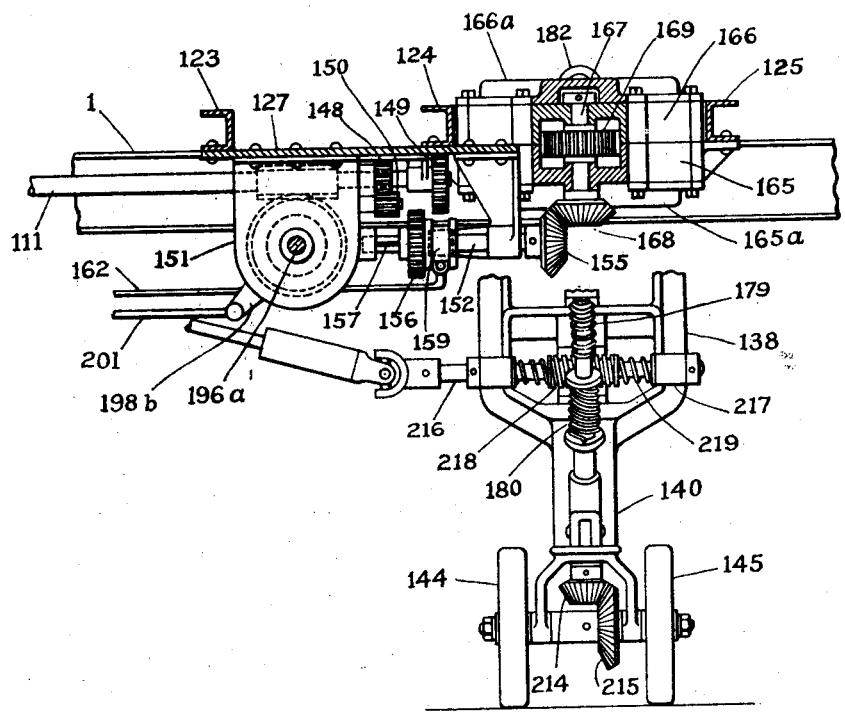
Figure 27:
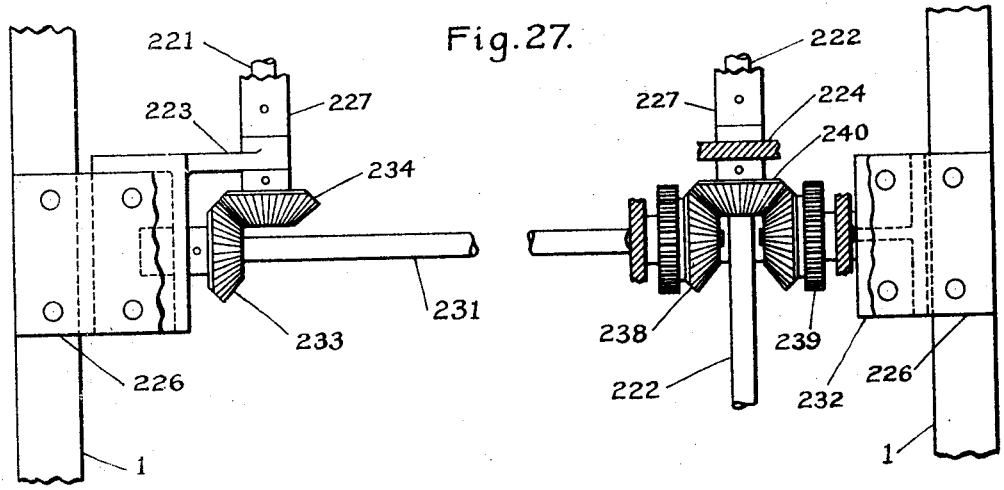
Figure 26:
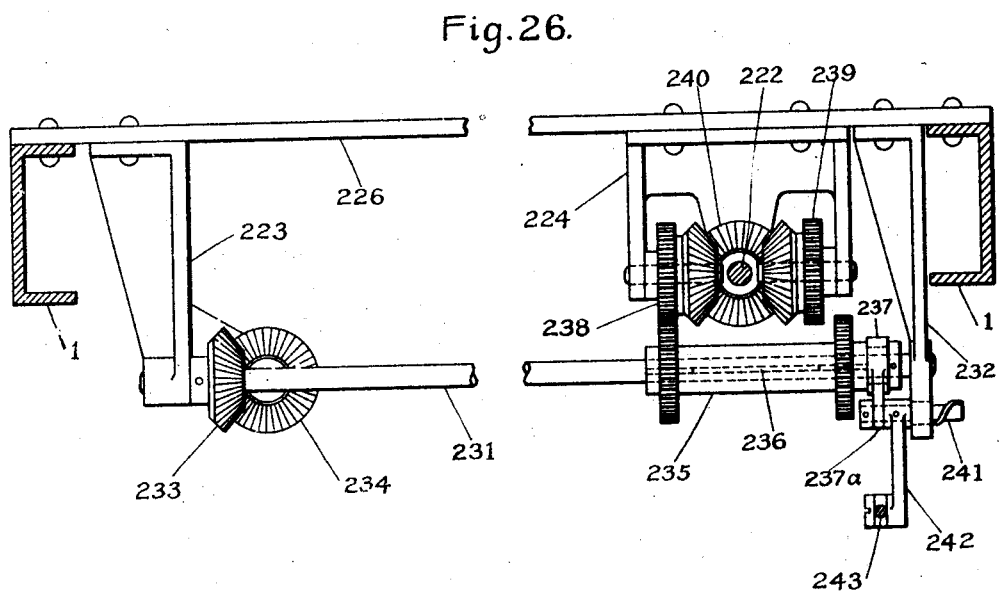
Figure 28:
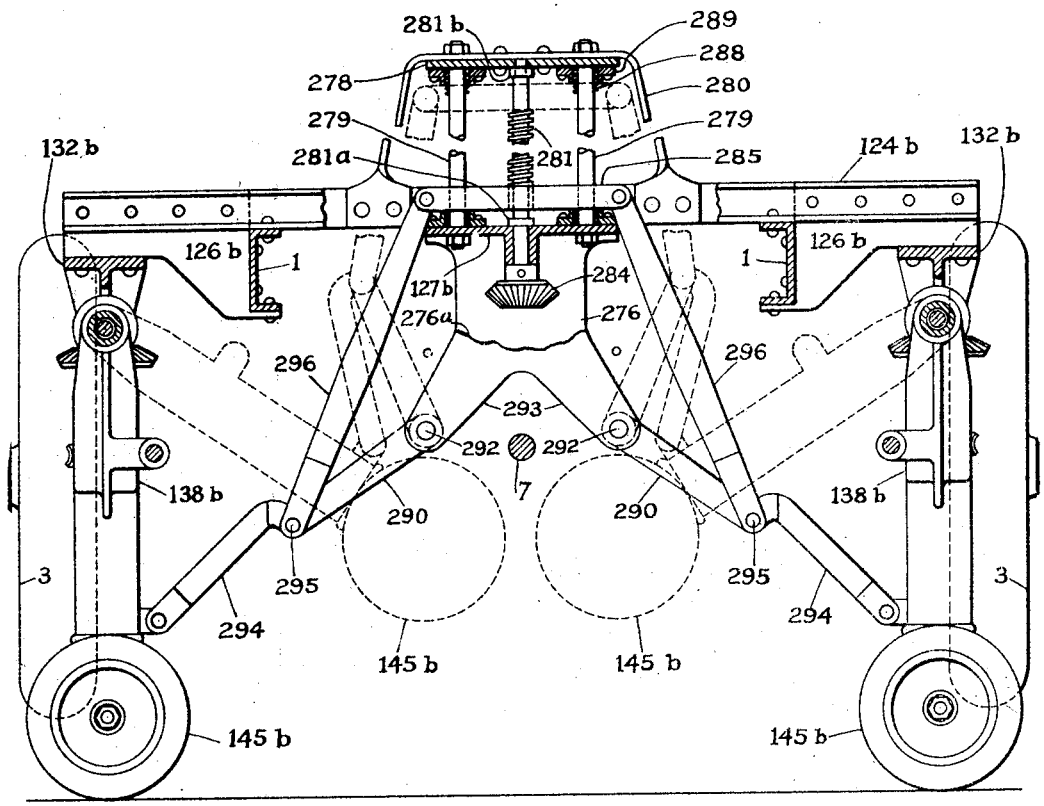
Figure 31:
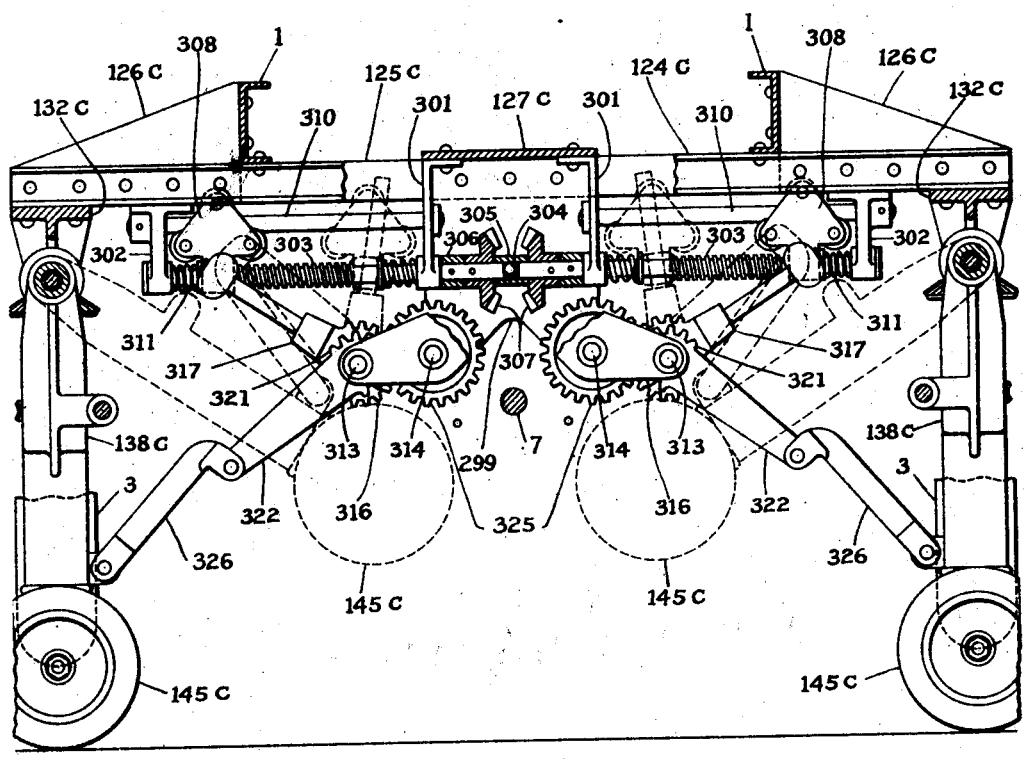
Figure 36:
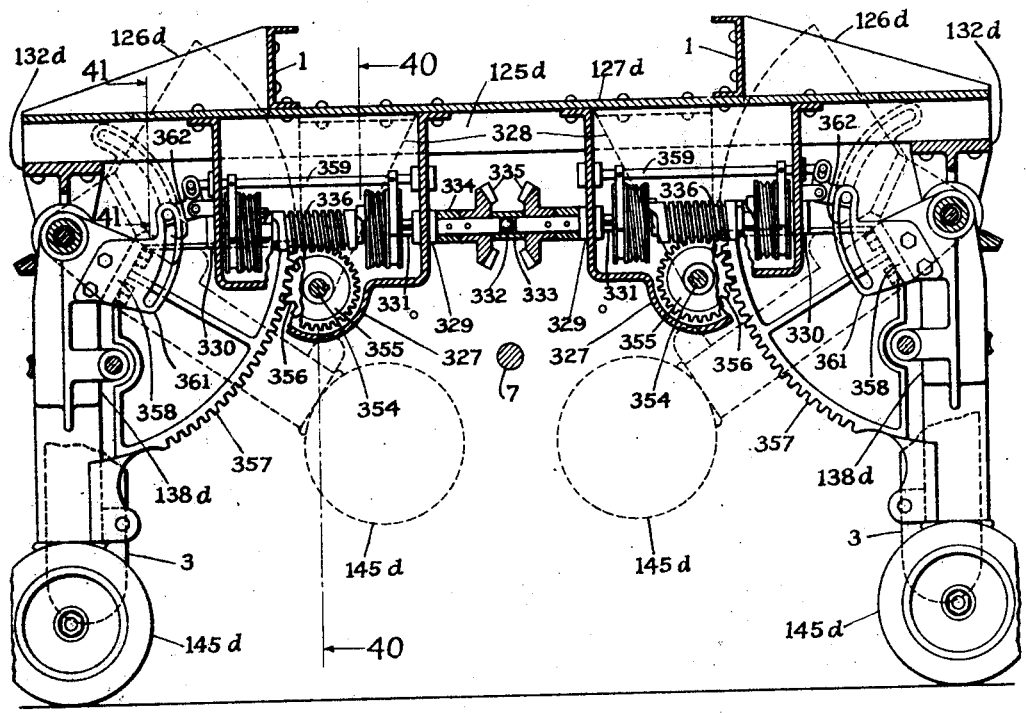
Figure 38:
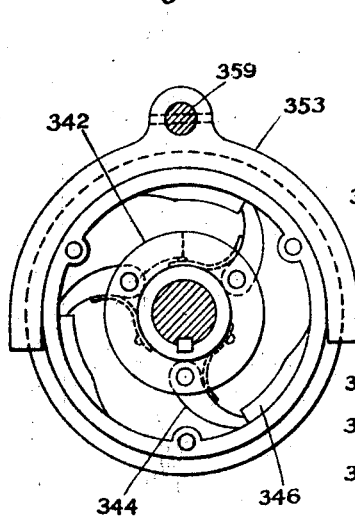
Figure 37:
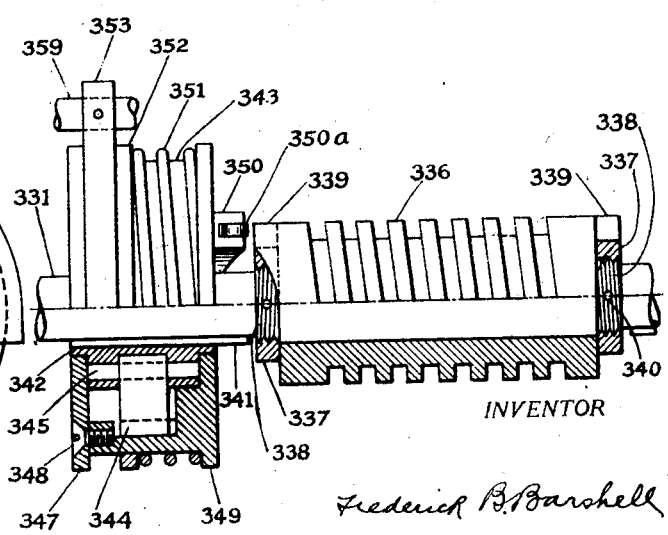

In the accompanying drawings Fig. 1, together with Fig. 1ᴀ, constitute a side elevation of a motor vehicle embodying my improvement, the nearer wheel of the main front wheels and that of the main rear wheels being omitted; the remaining wheels and power plant shown fragmentary and the auxiliary traction device arranged to swing transversely; Fig. 2 together with Fig. 2ᴀ constitute a plan of the same motor vehicle partially in section and fragmentary; Fig. 3 is a front view of the motor vehicle, fragmentary and partially in section showing the improved front wheels steering and driving mechanisms; Fig. 4 is an enlarged vertical sectional view of the driving mechanism of one front wheel, showing portions of the improved steering mechanisms therefor; Fig. 5 is an enlarged side elevation of the improved front wheel steering and reversing arm and showing the rider device; Fig. 6 is a top plan view of the steering and reversing arm referring to, showing the rod connection for operating the rider device; Fig. 7 is a horizontal section, partly plan view of the transmission gear mechanism for the front drive wheels, the parts being adjusted for cutting out the front wheels and the operating parts thereof being shown as positioned for running loose; Fig. 8 is a side elevation of the transmission gear mechanism referred to, partially in section and showing the housing therefor; Fig. 9 is a fragmentary side elevation of the rear end of the motor vehicle, showing a portion of my device to the rear of the rear wheels and arranged to swing transversely, the nearer main rear wheel being omitted; Fig. 10 is a fragmentary top plan view of Fig. 9; Fig. 11 is a fragmentary side elevation of the rear end of the motor vehicle, showing a portion of my device to the rear of the rear wheels and arranged to swing longitudinally, the nearer main rear wheel being omitted; Fig. 12 is a fragmentary top plan view of Fig. 11; Fig. 13 is a fragmentary elevation corresponding to the line 13—13, Fig. 12; Fig. 14 is a horizontal section of the clutch member for disengaging the rear driving wheels from the driving shaft; Fig. 15 is a transverse section of said clutch member taken on line 15—15, Fig. 14; Fig. 16 is also a transverse section taken on line 16—16, Fig. 14; Fig. 17 is a transverse section on the line 17—17, Fig. 2ᴬ, showing one of the types of the auxiliary device hereinafter referred to; Fig. 18 is a transverse section on the line 18—18, Fig. 2ᴬ, fragmentary and partially in section, showing an encased differential and transmission mechanism for the driving wheels of the auxiliary device; Fig. 19 is a fragmentary top plan view of Fig. 18, showing a portion of the gear transmission and operating parts for imparting lowering and elevating movements to the auxiliary device; Fig. 20 is a longitudinal section on the line 20—20, Fig. 19; Fig. 21 is a longitudinal section on the line 21—21, Fig. 2ᴬ, fragmentary and partly in elevation showing a portion of the transmission gear and steering mechanisms, operating parts and swingable support of one of the types of the device hereinafter referred to, for imparting lowering and elevating movements to the wheels thereof; Fig. 22 is an enlarged vertical section of the swingable support showing a portion of the driving and steering mechanisms for the wheels of the auxiliary device; Fig. 23 is an end elevation of Fig. 22 partly in section; Fig. 24 is an enlarged vertical section partly in elevation, showing a portion of the lowering and elevating transmission gear mechanism of the type of device shown in Fig. 17; Fig. 25 is a top plan view of Fig. 24, showing part of the gear casing removed; Fig. 26 is an elevation corresponding to the line 26—26, Fig. 2, showing a portion of the gear transmission of the steering mechanism for the wheels of the auxiliary device; Fig. 27 is a top plan view of Fig. 26 partly in section; Fig. 28 is a transverse section replaceable on the line 17—17, Fig. 2ᴬ, showing another type of the auxiliary device hereinafter referred to; Fig. 29 is a longitudinal section replaceable on the line 21—21, Fig. 2ᴬ, fragmentary and partly in elevation corresponding to the type, of device illustrated in Fig. 28 and showing a portion of the transmission gear and steering mechanisms, operating parts and swingable support of the last said type of device, for imparting lowering and elevating movements to the wheels thereof; Fig. 30 is a top plan view of the raising and lowering carriage plate embodied in Fig. 28 and Fig. 29; Fig. 31 is a transverse section substantially replaceable on the line 17—17, Fig. 2ᴬ, showing another type of the auxiliary device hereinafter referred to; Fig. 32 is a longitudinal section substantially replaceable on the line 21—21, Fig. 2ᴬ, fragmentary and partly in elevation corresponding to the type of device illustrated in Fig. 31 and showing a portion of the transmission gear and steering mechanisms, operating parts and swingable support of the last said type of device, for imparting lowering and elevating movements to the wheels thereof; Fig. 33 is an enlarged elevation, partly in section, of a portion of the mechanism for lowering and elevating the wheels of the auxiliary device shown in Fig. 31 and Fig. 32; Fig. 34 is a bottom plan view of a portion of the transmission gear mechanism shown in Fig. 33; Fig. 35 is an end elevation of the rider mechanism actuated by the threaded spindle shown in Fig. 33; Fig. 36 is a transverse section substantially replaceable on the line 17—17, Fig. 2ᴬ, showing another type of the auxiliary device hereinafter referred to; Fig. 37 is an enlarged elevation fragmentary and partly in section of the clutch member in the transmission mechanism for lowering and elevating the wheels of the auxiliary device of the last said type; Fig. 38 is an end elevation of the clutch member shown in Fig. 37, the cover plate thereof being omitted; Fig. 39 is a longitudinal section substantially replaceable on the line 21—21, Fig. 2ᴬ, fragmentary and partly in elevation corresponding to the type of the device illustrated in Fig. 36 and showing a portion of the transmission gear mechanism and of the operating parts, for imparting lowering and elevating movements to the wheels of the type of the auxiliary device referred to; Fig. 40 is a longitudinal section on the line 40—40, Fig. 36, showing a portion of the transmission gear and steering mechanisms and swingable support of the last said type of device, for imparting lowering and elevating movements to the wheels thereof; Fig. 41 is an end elevation on the line 41—41, Fig. 36, showing a portion of the clutch shifter mechanism; Fig. 42 is a side elevation of the shifter mechanism shown in Fig. 41; Fig. 43 to Fig. 57, both inclusive, are diagrammatic views illustrating some of the usual directional dispositions of the steering wheels of the vehicle as are operably effected by the improved steering mechanisms hereinafter referred to.

By referring to Figs. 1, 2 and 3, which show generally a portion of my improved construction as applied to the forepart of the vehicle and to Figs. 1A, 2A and 17, which show generally one aspect of my improved construction as applied to the rear of the vehicle, it will be seen that the arrangement included in the former group embodies a power transmission mechanism and a steering control mechanism for the front main wheels, making said wheels power driven steering wheels, provided with controls operable to cut out one or both front wheels from the driving connection; the latter group embodies one aspect of one of the several types of auxiliary traction and steering devices hereinafter described and is shown mounted in the chassis at the rear of the vehicle, the said auxiliary device including, a pair of traction frames each provided with a traction member, a suitable transmission mechanism for bringing said traction members into or out of engagement with the road surface, a driving transmission mechanism and steering control mechanism for said traction members and an independent control mechanism actuated from the driver's seat (at this point it should be stated, that while the auxiliary traction and steering device is here shown in the rear portion of the vehicle, the said auxiliary device may be adapted for operation in the forepart thereof). It will also be understood from the construction shown, that in their practical application with such vehicles, either the said mechanisms for the front main wheels or the said auxiliary traction and steering device may be employed or both the said mechanisms for the front main wheels and the auxiliary device may be made to coact in a manner like that indicated in the diagram Figs. 43 to 57 both inclusive, at the will of the operator.

In the embodiment of my invention shown on the drawings, an automobile of the usual type is shown provided with a chassis 1 having the main front wheels 2—2 rotating on the front axle 4 and the main rear wheels 3—3 rotating on the rear axle 5, said axles 4 and 5 being stationary members suitably connected to the chassis 1. The power plant, which is secured to the chassis includes a motor or engine 6; a shaft 7 to which said power plant delivers power at the rear thereof, connects to the rear driving wheels by the usual transmission and differential mechanisms 8. Referring to Figs. 1, 2, 3, 4, 5, 6, 7 and 8, the power transmission mechanism and the steering gear for the main front wheels as a whole, will be made evident. The power transmission mechanism as shown in Figs. 7 and 8 is mounted partly in a two part housing, the sections 9—9a of which, are suitably supported upon and secured to a cross frame 10, which is securely fixed to the chassis 1, while at the ends of axle 4 the vertically positioned yokes 4a, which are similar, though larger and stronger than the steering yokes in common use, accommodate the steering and driving connections. The said section 9 provides a bearing for the forward end 7a of the motor driven or power shaft, that shaft projecting into the housing and carrying within it a clutch member 11a rotatably mounted thereon and provided with a hub to which a gear member 12 is keyed. A co-acting clutch member is shown at 11 keyed to shaft 7a and actuated by a lever control mechanism hereinafter described, through the forked arm 11f, which at one end pivotally engages a bracket on the section 9a and at the forked end is adapted to impart an axial movement to said clutch member 11. A manually operated clutch band mechanism 11b is adapted to coact with the rim of the clutch member 11a, operative means for said clutch band not being shown. A hollow journal 20 rotatably mounted, journaled at one end in the section 9a of the housing 9—9a and at the other end in the bearing 21 securely supported on the cross frame 10, the said hollow journal being coaxial with the power-driven shaft 7a and clearing the latter, extends part way into the housing 9—9a. 22—22 indicate a pair of bevel gears oppositely disposed and mounted fixedly to turn with the hollow journal 20 outside the housing 9—9a and together designate what is hereinafter termed the multiple gear mechanism. The gears 22—22 are spaced apart to accommodate between them the movable bevel gears 23—23 arranged at each side of said hollow journal 20, the said gears 23—23 being adapted for operative engagement with either of the gears 22—22, for alternating engagement therewith or they may be set between the gears 22—22 in an inoperative position as hereinafter referred to. Positioned on the side of the shaft 7a and journaled in the housing 9—9a is shown a worm 13 having the gear member 14 fixedly mounted thereon, which engages and receives power from the gear member 12 keyed to the clutch. A worm gear 15 in enmeshed engagement with the worm 13 is keyed to a rotatably mounted shaft 16 journaled in the bracket 17, which is rigidly secured to the housing 9—9ª. The bracket 17 is provided with a hub 17ª at one end thereof, surrounding shaft 7ª and leaves a clearance space between it and the shaft; the coil spring of the thrust bearing of the clutch 11 abuts at one end with the hub 17ª while the thrust bearing positioned at the other side of the clutch abuts with the housing section 9, thus eliminating any axial strain from the shaft 7ª. A bevel gear member 18 keyed to the rotatable shaft 16 is in enmeshed engagement with a bevel gear 19 fixedly mounted on and delivering power to the hollow journal 20 of the last said multiple gear mechanism. The clutch member 11, it will be seen in Fig. 7, is arranged for being operated by a suitable lever control 11ᶜ actuated in any suitable way by the operator. A pair of cross, power transmission or driving shafts, extensible and rotatably mounted are positioned one at each side of the power shaft 7ª to transmit the engine power from said multiple gear mechanism to the driving mechanisms of the front main wheels 2—2, as shown in Fig. 3 and Fig. 4. The inner and outer ends 24 and 24ᵉ of said respective driving shafts are slidably coupled by the extension shaft 24ᵇ and the coacting sleeve 24ᵈ, which are joined to said ends respectively, by the universal joint members 24ª, the said shafts 24ᵇ being held against rotation in the sleeves 24ᵈ by a plurality of keys 24ᶜ. The inner end 24 of the respective cross shafts is journaled in a bushing 25, which is slidably mounted in a bearing 26 rigidly supported by the bracket 27 upon the cross frame 10. The outer end 24ᵉ of said cross shafts is journaled upon a substantially fixed axis in the respective yokes 4ª at the ends of the axle 4. 23 and 28 designate bevel gears fixedly mounted to the shaft ends 24 and 24ᵉ of the respective cross shafts. The gears 23—23, when operably moved by a lever control mechanism hereinafter explained, with the slidable bushings 25—25, are guided in their paths by the respective bearings 26—26 between the gears 22—22 to which the bevel gears 23 are adapted for engagement. Thus the pair of cross driving shafts are adapted to operate at their respective inner ends at levels varying with those of the outer ends. The yokes 4ª—4ª are provided at their ends respectively with openings in which are journaled spindles 29, one in each yoke upon a vertical axis and these together with the yokes 4ª—4ª accommodate the steering and driving mechanisms for the front main wheels 2—2. Fixedly mounted on the respective spindles 29 and bearing against the upper and lower arms of the yokes 4ª is the sleeve 30 provided with a projecting stub axle 31 supporting the front main wheel 2. 32 designates a bevel gear rotatably mounted and slidable on each sleeve 30. Said slidable gear 32 interposes between the driving gear 28 fixed at the outer end 24ᵉ of the power driven shaft and the bevel gear 33 keyed to the inner end of the hub 34 of wheel 2 and is adapted to be brought into engagement with the bevel gears 28 and 33 at each yoke by operable means, which will hereinafter be explained. A spring 35 is mounted on each sleeve 30 abutting at one end on a shoulder 30ª and at the other end abuts with the hub of bevel gear 32 through the medium of the anti-friction device 36; said spring 35, when expanded, holds the bevel gear 32 out of mesh in an inoperative position. In order to bring the bevel gear 32 into operative engagement the said gear is movably brought into mesh with gears 28 and 33 against the expansive force of the spring 35, said spring, when compressed, being of such strength that, when permitted to expand, will overcome the frictional resistance incident to the sliding tooth faces of the gears in contact and will bring said gear 32 clear out of contact into an inoperative position. By now referring particularly to Fig. 3 and Fig. 4 it will be seen that the specific construction of lever connections shown for actuating the slidable bevel gears 32—32, is arranged to coact with the controls operable for my improved steering mechanism for the front main wheels 2—2. Integrally connected with each of the spindles 29—29 at the lower end and outside the yoke 4ª, is the head 29ª provided with the hub 29ᵇ, said head 29ª being arranged to bear against the lower arm of the yoke 4ª. The sleeve cams 37—37 loosely mounted and slidable on the sleeves 30—30, have an anti-friction contact face 37ª for coacting with the like shape cam members 38—38 fixedly mounted to rotate with the spindles 29—29. The sleeve cams 37—37 are constrained against rotation by the projecting arms 37ᵇ—37ᵇ, which move in the guides 37ᶜ—37ᶜ in the yokes 4ª—4ª parallel with the respective axes of the sleeves 37—37 and abut with the respective hubs of the slidable gears 32—32 on the side thereof opposite to said springs 35—35 and are movably supported thereby through the medium of the anti-friction devices 39—39. The separator sleeves 40—40 secured to the shoulders 30ª of sleeves 30—30 insure proper spacing of the interposing gears 32—32 with the respective engaging gears 28 and 33. Thus, when a turning movement is imparted to the spindles 29—29 in a manner, which will hereinafter be explained, the interposing bevel gears 32—32 are moved axially along the respective sleeves 30—30 into or from engagement of the coacting gear 28 and 33. As hereinbefore stated, the construction I have shown for actuating the interposing gear members 32—32, shows them to be thrown into or out of action automatically upon the turning movement of the wheels 2—2 by the steering controls and this aspect of its practical application is illustrated in the angular disposition of the wheels of a moving vehicle shown diagrammatically in Fig. 32 to Fig. 57 both inclusive. It is obvious that the lever connections for controlling the axial movement and for operably actuating said gear members 32—32 on the respective sleeves 30—30, may be made independent of the steering controls. To protect the driving mechanism of the front main wheels from dirt a suitable enclosure or housing may be provided for the same.

In order to bring the gears 23—23 into operative engagement with the multiple gear mechanism or to bring the same from engagement thereof, there is provided as shown in Fig. 7 and Fig. 8 a shaft 41 mounted parallel with and vertically over the power driven shaft 7ª and secured at one end by a bracket 42 to cross frame 10, the said shaft 42 being provided with a helical thread and a flange at the rear end thereof. A nut member 43 provided with a lever arm 44 is in enmeshed engagement with said helical thread and is adapted to oscillate to one side or the other side about the axis of shaft 41, whereby the nut member 43 may be axially moved along shaft 41 toward one end thereof or the other end. An annulus 45 loosely mounted in an annular groove on the nut member 43 and movably supported thereby carries a pin 46 polarily arranged and depending therefrom. A pair of rods 48—48 arranged longitudinally connect pivotally at one end by the lugs 25ª—25ª to the respective bushings 25—25 and engage pivotally at the other end to a cross arm 47, which is pivotally mounted upon to the pin 46 on the annulus 45, said cross arm 47 being yieldably constrained in a transverse position by a spring 49 secured centrally on the bracket 42. Pin 46 connects with cross arm 47 at a point midway between rods 48. Connecting rod 51 is shown provided with a slotted member 50, which permits nut member 43 through the medium of cross arm 47 to actuate bushings 25—25 simultaneously in one direction or in the opposite direction, when the rod 52 imparts an oscillating movement to the lever arm 44 of nut member 43, while, when the nut member 43 is stationary, connecting rod 51 is adapted to actuate cross arm 47 by one end 47ª extended, to swing about the pin 46 against the force of the spring 49 to actuate bushings 25—25 in alternate directions. By reference to Fig. 1 and Fig. 2 it will be seen that the control mechanism for bushings 25—25 hereinbefore described, is arranged for being operated by the respective bell crank lever control parts—rod 52, bell crank 53 mounted on a suitable bracket 53ª, connecting rod 54, bell crank 55 mounted on a counter shaft 121, control rod 56 and the lever control parts—connecting rod 51, bell crank 51ª mounted on the counter shaft 121, control rod 51ᵇ, both control rods 56 and 51ᵇ leading to levers of the type 57 capable of being oscillated on the shaft 58; each of said levers carries a pawl 59 cooperating with a notched sector 60, which is fixedly mounted to the vehicle, the pawls 59 being adapted to be moved from engagement of the said sectors 60 through the medium of the spring control 61 at the handle mounted upon the lever 57. It will now be understood that the multiple gear mechanism receives its power from shaft 7ª through the medium of the transmission mechanism comprising the clutch members 11 and 11ª, gear members 12 and 14, worm 13, worm gear 15 and gear members 18 and 19 on the shaft 16 and hollow journal 20 respectively, the clutch members being provided with the lever control parts including—the connecting rod 11ᶜ pivotally engaging the shifter arm 11ᶠ, bell crank 11ᵈ mounted on the counter shaft 121 and control rod 11ᵉ leading to a manually operated lever of the type 57 and similarly mounted, the said lever control mechanism serving to cut out the said multiple gear mechanism from the power driven shaft 7ª. It will also be clearly seen, that the multiple gear mechanism in turn delivers power to the driving mechanisms of the front main wheels equipped with the respective movable gear member 32—32 through the medium of the shiftable gears 23—23, the power transmission mechanism including the shafts 24—24 each coupled slidably with the respective shafts 24ᶜ by the extension shaft 24ᵇ and the coacting sleeve 24ᵈ, which are joined respectively to said shafts by the universal joint members 24ª; the said gears 23—23 being operably actuated with the bushings 25—25 between the gear members 22—22 by the respective lever control parts—rod 52, bell crank 53 mounted on the bracket 53ª, connecting rod 54, bell crank 55 mounted on the counter shaft 121, control rod 56 and the control parts—connecting rod 51, bell crank 51ª mounted on the counter shaft 121, control rod 51ᵇ, both control rods 56 and 51ᵇ leading to levers of the 57 and acting through the medium of the nut member 43, the cross arm 47 and the pair of rods 48—48, whereby the gears 23—23 are moved into engagement with one gear 22, with the other gear 22, moved between said gears 23—23 in a position that renders them inoperative with both gears 22—22, or to move the same in alternate directions, whereby one gear 23 is brought into engagement with one of the gears 22 and the other gear 23, into engagement with the other gear 22. With the setting of the alternating gear members 23—23 relative to those of the multiple gear mechanism, as hereinbefore pointed out, rotation may therefore be imparted to the front main wheels 2—2 in one direction, in the opposite direction or in alternate directions according as the wheels are angularly disposed; or, the wheels 2—2 may be permitted to run loose or held against rotating by the manually operated clutch band mechanism 11ᵇ.

Secured to the hub 29ᵇ of one of the spindles 29 is the steering arm 62 and secured to the lug 29ᶜ at the lower end of the other spindle 29 is another arm 63 hereinafter referred to as a steering and reversing arm. Said steering and reversing arm, which is provided with the lug 63ᵃ by which said steering arm 63 is rigidly secured to lug 29ᶜ of the respective steering spindle, is secured and arranged so that the concave side of same faces the other steering arm 62. A cross rod 65 connecting pivotally at one end to the projecting end of arm 62 and at the other end pivotally to a rider device 64 adapted to be operably shifted along said steering and reversing arm 63, serves to impart a joint sidewise movement to steering arms 62 and 63, the said cross rod 65 being provided with a bend 65ᵃ at the end adjacent the rider device 64 to constrain the spring 64ᵇ hereinafter referred to, to hold the rider device 64 to the end of the steering or reversing arm 63. The rider device 64, which is provided with the roller 64ᵃ movably supports its respective end of cross rod 65 for adjusting same for steering operation and is slidably mounted on said arm 63 in a track having a curvature adapted for the angular displacement of cross rod 65 from its normal position about the projecting end of arm 62, when the front main wheels 2—2 are positioned as shown in Fig. 2 and Fig. 3. The track or guide on said arm 63 extends substantially as far to one side as to the other side of a line that is normal to the curved track and that passes through the pivotal axis of the respective steering spindle 29, and, for a normal position of the wheels 2—2 with the same set parallel and directed forward as in Fig. 2, a normal adjustment of cross rod 65 sets the axes of pivotal connection thereof on the same side of a straight line joining the axes about which wheels 2—2 respectively turn and makes the relative position of the pivotal axis at one end of cross rod 65 to the pivotal axis about which the steering wheel at that side swings, the same as the relative position of the corresponding two axes at the oppositely disposed wheel. A catch mechanism comprising a spring 64ᵇ is secured to the rider device 64 for constraining said device to the arm 63 against displacement at the shouldered ends thereof, when said rider 64 is positioned at either end of the track. It should be stated at this point that a suitable mechanism may be used for locking said rider device 64 to either end of its track through the medium of the operating control rod 72, which engages rod 65. In order that cross rod 65 may be angularly actuated along arm 63 about the end of arm 62, there is provided a shaft 66 journaled in the bracket 67, which has bearings 67ᵃ and 67ᵇ and which is rigidly secured to the side of chassis 1. Of a pair of gear members 68 and 69, both fixedly mounted on shaft 66, one gear 68 is in enmeshed engagement with a rack 70, which is slidably mounted in the bearings 67ᵃ and 67ᵇ and also in another bracket 71 fixed to that side of the chassis, said rack 70 being adapted to be moved forwardly or rearwardly. A rack 73 adapted to be actuated by hand or foot at 73ᵃ and in enmeshed engagement with the gear member 69 is slidably mounted in bracket 73ᵇ, which is fixed to a cross beam 1ᵃ of the chassis. An intermediate rod 72 connects pivotally at one end to cross rod 65 and at the other end pivotally by the pin 70ᵃ to rack 70, the said bracket 71 being slotted on the under side at 71ᵃ to accommodate the passage of said pin 70ᵃ during the operation of rack 70. It will now be understood that the cross rod 65 may be actuated along the steering or reversing arm 63 in one direction or in the opposite direction by the reciprocable control rack 73 through the medium of gear members 69 and 68, rack 70 and rod 72, whereby the steering arms 62 and 63 may be arranged to impart a sidwise turning movement to wheels 2—2 in unison to position them in a direction parallel to each other or in directions at any angle to each other convergent or divergent and, that the rod 72 is adapted to oscillate and move with the cross rod 65 as the sidewise movement of the wheels 2—2 may demand. Connected pivotally to the projecting end of the lever arm 74 attached to the steering spindle 29, is the rod 75 through which angular movement is imparted to the lever arm 74 in one direction or in the opposite direction by the manually operated steering wheel 78 through the medium of the steering post mechanism 77 and the steering lever arm 76, whereby to impart a sidewise turning movement to the front main wheels 2—2 in unison at any angle in one direction, in unison in the opposite direction or to turn one of said wheels 2 sidewise at any angle in one direction, the other wheel 2 turning in unison in the reverse direction. The form of construction comprising the rod 75, the steering post mechanism 77 and steering lever arm 76 together with the steering wheel 78 is of the usual type in automobiles to serve as a portion of the steering mechanism for the front main wheels and needs no further description as it constitutes no part of my present invention in itself.

As indicated on Figs. 1, 2 and 3, the hereinbefore described driving and steering mechanism is, in the present embodiment of my invention embodied on the forepart of the chassis; the same idea may of course be embodied on the rear end of the chassis as well as on the forward end thereof, but inasmuch as such a construction would be very similar to the one already shown and described, the foregoing description will suffice to make this application clear.

Several aspects of substantially the same transmission mechanism for the operation of the auxiliary traction and steering device are shown generally in their practical application to a motor vehicle in Figs. 1ᴬ, 2ᴬ, 11, 12, 17, 18, 19 and 20 and will hereinafter be described. To an auxiliary frame of cross beams 123, 124, and 125 braced by the plate 127 and arranged forward of the rear main driving wheels of the motor vehicle and rigidly fixed to the chassis 1—1 by the brackets 126 as shown in Figs. 2ᴬ and 17, there are secured a pair of opposite disposed bearing blocks 132—132 on the under side of said brackets and positioned outside the side beams of the chassis 1—1. From the brackets 134 and 135 attached to each bearing block there are projecting the journals 136 and 137 respectively, coaxially arranged as shown best in Figs. 22 and 23. Journaled to these journals of each bearing block are the forked frames 138—138 respectively, which are arranged to oscillate thereon substantially vertically. A nut member 139 engaging the threaded end of the respective journals 137 prevents the forked frames 138—138 from sliding along the journals 136 and 137 of each bearing block. The arms of said forked frames, which are of T-section are joined for greater stability near the ends upon which they depend, by a cross brace 131 having a centrally positioned hub 130 and, at the juncture of said arms unite into a hub shaped support 140, whose axis is at right angles of and in the same plane with that of the journals on the respective bearing blocks. A hollow journal 141 mounted to rotate coaxially within the hub 140 of each forked frame 138, is provided at the lower end thereof with a yoke 142, in whose forked ends an axle 143 is journaled carrying a pair of wheels 144 and 145, which may be either in the form of the ordinary rubber tired automobile wheel or of any other desired and suitable construction, one of which, 145 is fixedly mounted and the other wheel 144 rotatably mounted on the axle 143 outside the yoke 142. The upper end of the hollow journal 141 has a worm gear 146 fixedly mounted thereon and abutting with the inner end of the hub 140. Ball bearings 147 are positioned between the lower end of the hub 140 and the shouldered portion of the yoke 142. The construction of the forked frames 138 together with their respective pairs of wheels 144 and 145 is such, relative to the rear main driving wheels of the motor vehicle, that when said forked frames are forced downwardly into vertical position, as shown in Figs. 1ᴬ and 17 and indicated in a different aspect in Fig. 11, the respective pairs of wheels 144 and 145 are brought into engagement with the road surface, at the same time elevating the rear main wheels 3—3 from the road surface and imparting a slight tilt to the chassis 1—1, which a slight camber in the side beams thereof will help to offset. At this point it should be stated that the respective pairs of wheels 144 and 145 of the auxiliary traction and steering device may be arranged to swing longitudinally or transversely of the motor vehicle according as the respective bearing blocks 132 are arranged in their adaptation to the desired direction, and the aspect of the device operating in a longitudinal direction and one operating in a transverse direction, have accordingly been illustrated by one of the several types as shown generally in Figures 1ᴬ, 2ᴬ, 11, 12, 13 and 17 and hereinafter described.

By referring to Fig. 1 and Fig. 1ᴬ and also to Fig. 2 and Fig. 2ᴬ it will be seen that power shaft 7, which connects to the rear main driving wheels 3—3 by the differential mechanism 8, is adapted to deliver power to the auxiliary traction and steering device, to be hereinafter described and generally shown in Figs. 1ᴬ, 2ᴬ, 9, 10, 11 and 12, through the medium of a rotatably mounted driven shaft 111, which is arranged to be operably engaged with said power shaft 7 to receive power therefrom; the said power shaft 7 is provided also with a lever controlled clutch mechanism positioned between the working end of power shaft 7 and the driving connection thereof with the driven shaft 111 referred to, to disconnect the rear main driving wheels 3—3 from the engine power. Thus spaced apart from the driving gear member 115, which is fixedly mounted on power shaft 7 and that serves as a portion of the driving connection for the driven shaft 111, there is mounted a two part housing, the sections 80 and 81 of which, are suitably supported upon and secured to a cross frame 82, which is rigidly fixed to the chassis 1. The said sections, when joined together, as shown particularly in Figs. 14, 15 and 16, accommodate anti-friction and thrust bearings 87 and 88 in horizontal alignment for each of the two ends of the divided power shaft 7 that project into the said housing. A round spacing rod 83 with anti-friction bearings at the ends is shown adapted to engage a socket in the respective ends of shaft 7 within said housing. Said rod 83 tending to hold said shaft ends in alignment and to maintain proper spacing between the coacting ends of power shaft 7 within the clutch housing. Fixed on the forward end of the power shaft within the housing 80—81 is a positive driving clutch 84 provided with a plurality of teeth 85 and, slidably mounted on the fluted rear end of the power shaft within the housing is the coacting clutch member 86 normally in enmeshed engagement with clutch 84, thereby bringing the said two ends within the housing into locked engagement. A coil spring 89 within the slidable clutch member 86 and mounted coaxially with the power shaft therein, abuts at one end with the fluted end of the power shaft and at the other end with an inturned end flange of a sleeve 90, which is fixed to the interior wall of clutch member 86 by the set screw 91 and is mounted to abut with the shouldered portion of the forward end of the power shaft, when the clutch member 86 is in locked engagement. Interposed between the end of sleeve 90 and another sleeve 92 mounted on the power shaft and which snugly engages the interior wall of the clutch member 86, there is a radial ball bearing 93 upon which clutch member 86 bears. Thus it is seen that said spring 89, when expanded as shown in Fig. 14, yieldably constrains the clutch member 86 in locked engagement with the clutch 84, while the bearings 87 and 88 and the spacing rod 83 provide for the proper spacing and stability axially along the power shaft within the housing 80—81. Mounted rotatably on the reduced portion of clutch member 86 and interposed between a pair of thrust bearings, one at either side, there is a ring 94 which is provided with a pair of pins 95 and 96 polarily arranged thereon. A yoke 97 provided with a hub 98 is pivotally connected to the housing 80—81 on a vertical axis by the pin 99 and has openings at the ends of the arms thereof engaging swivelly the pins 95 and 96 of ring 94, said openings being elongated so that an angular movement of yoke 97 on the pin 99, will impart an axial displacement of clutch member 86 along the power shaft through the medium of the ring 94. The thrust bearings mounted at the ends of ring 94 comprise bearing rings 100 and 101 loosely mounted on clutch member 86, one abutting at each end of the ring 94, the balls 102 of one thrust bearing travelling between the ring 100, ring 104ª and the clutch member 86 and the balls 103 of the other thrust bearings travelling between the ring 101, the inturned ring 104 and the clutch member 86, the said inturned ring 104 being fixedly mounted to the clutch member 86 by the screws 105. A lever control mechanism to be hereinafter described is connected by the lever arm 106 to the outwardly projecting end of the pivotal pin 99 to turn the said pin in one direction or in the opposite direction and thereby to actuate the clutch member 86 as just described, against the force of spring 89 along the power shaft from engagement with the clutch 84 or to bring same into engagement therewith. The upper section 80 of the clutch housing is provided with a bracket 107 by which it is secured to cross frame 82, said bracket having a bearing 108 flanked by a pair of slotted lugs 109—109, one at each side of and attached to said bearing.

Positioned above the power shaft 7 and journaled in the bearing 108 and also in the housing 151 of a differential mechanism enclosed therein and which is secured to the chassis by an auxiliary frame hereinafter described, there is shown the driven shaft 111 previously referred to, having a lever controlled gear member 114 slidably mounted thereon and held against rotating on said shaft 111 by means of a plurality of keys 113. The gear member 114 which is provided with a hub 112, is adapted to be operably brought into engagement with the driving gear member 115 by a shifter ring 116, which is loosely mounted in an annular groove on the hub 112. The said shifter ring 116 is provided with a pair of pins 117 and 118, polarily arranged, to slide in the slotted recesses of lugs 109—109 and connects pivotally by one of said pins 118 extended to a lever control mechanism including connecting rod 119, bell crank 120 mounted on counter shaft 121 and the control rod 122, connected by a type of control hereinbefore described to a manually operated lever, whereby to impart an axial movement to gear member 114 to bring same into engagement with gear member 115 or to move same from engagement of said gear member. At this point it should be stated that while a lever control mechanism of the type hereinbefore described may be made for individually actuating the lever arm 106 of the clutch mechanism previously described, I have shown, for the sake of simplicity and clearness, the lever arm 106 operable simultaneously with the controls for the slidable gear member 114 through the rod 110. Near the rear end of the driven shaft 111 on which two gear members 148 and 149 are fixedly mounted and spaced apart, said shaft 111 is provided with a worm in enmeshed engagement with the master gear of a differential mechanism 151 of a well known and usual form of construction as indicated in Figs. 18, 19, 20 and 21. A pinion gear 150, mounted rotatably to the housing 151 of the differential mechanism outside thereof, below and to one side of the driven shaft 111, meshes with the gear member 148. Positioned below the driven shaft 111 and journaled in suitable bearings 153 attached to the housing of the differential mechanism and 154 secured to the plate 127, is shown the counter shaft 152 carrying a bevel gear 155 fixed to the end and a sliding gear member 156 spaced apart therefrom and held against rotating on said shaft by means of a plurality of keys 157. The sliding gear 156 is provided with a hub 158 and is adapted to be operably brought into engagement with the gear member 149 or the pinion gear 150 as desired, by a shifter ring 159, which is loosely mounted in an external groove on the hub 158. An arm 160 provided at one end with a yoke swivelly engaging pins of the shifter ring 169 in elongated holes, is connected pivotally at the other end to a suitable bracket 161 attached to bearing 154 as shown in Fig. 19. A rod 162 pivotally engaging arm 160 connects to a bell crank 163 mounted on counter shaft 121. A control rod 164 pivotally connected to last said bell crank leads by a type of controls hereinbefore described to a manually operated lever, whereby to bring the sliding gear 156 into engagement with the gear 149 or the pinion 150 as desired, or to move same from engagement of said gear members.

For the operation of my improved traction and steering device I employ a cooperative transmission mechanism for elevating or lowering the traction wheels thereof and for imparting rotation to said traction wheels; also, I employ an operable steering mechanism to impart steering adjustment to the traction wheels, the said operating mechanisms being under the control of the operator. From Figs. 17, 21, 24 and 25, it will be seen that the gear transmission mechanism for elevating or lowering the traction wheels 144 and 145 of each traction frame, is mounted in a two part housing 165—166 with top cover 166ª and bottom covers 165ª—165ª. The said housing is suitably supported upon and secured by the auxiliary frame to the chassis 1—1 and the said sections, when joined together as shown, provide a bearing for a short vertical shaft 167, positioned centrally of the housing and having a bevel gear member 168 fixed thereto at the lower end and in mesh with the bevel gear 155 from which it receives power. 169 designates a gear member positioned between the upper and lower housing sections and is keyed to turn with the short shaft 167. A pair of gear members 170—170 provided each with an annular space, are each mounted to rotate peripherally within the housing 165—166 and in intermeshed engagement with and on opposite sides of gear member 169. Engaging the interior wall of each gear 170 and secured thereto by a plurality of dowels 172, is the annulus 171, the said annuluses being provided each with a pair of annular grooves positioned one at each end thereof. Race rings 173, one disposed opposite each end of the respective annuluses 171 and secured by screws to the respective upper and lower housing sections 166 and 165, are provided with annular grooves and, interposing between the respective annuluses 171 and the respective oppositely disposed annuluses 173 and travelling within the respective grooves thereof, which are adapted for their reception, are the ball bearings 174. Positioned within the annular space of each gear member 170 and provided each with a pair of bearing pins 175 polarily arranged thereon, is a ring 176 swivelly engaging the respective annuluses 171. A nut member 177 positioned within the respective rings 176 and provided each with a pair of trunnions 178 oppositely disposed and in alignment at right angles to the axis of the respective nut members, swivelly engages each ring 176, the said nut members 177 being adapted to swing on their respective trunnions, whose axes are at right angles to those of the respective pairs of polarily arranged pins 175. Threaded spindles 179—179, which have a shank at their respective ends, connect each pivotally at one end with the lower part of the respective swingable frames 138 with which they are adapted to oscillate, and operate each within its respective nut member 177 with which they are at times in enmeshed engagement. The shanks of said spindles 179 are each adapted to receive a spring 180 together with a slidable abutting collar 181 and also accommodate the respective nut member 177 to rotate loosely thereon at the end of each stroke of the reciprocable spindles 179. The sleeve 182 with an inturned end flange fixed at one extremity of each spindle 179 and the collar 183 secured near the other end thereof, serve to retain their respective springs 180 in position, whereby to constrain the threaded spindles to confront enmeshing with their respective nut members at the end of each stroke, as is best shown in Figs. 17 and 24. It will now be seen that the engine power in the driven shaft 111, when transmitted by either the spur gear 149 or the reversing pinion 150, through the medium of sliding gear 156, and gear 155 on shaft 152, the gears 168 and 169 on shaft 167, to the peripherally rotatable gear members 171, a rotary movement will be imparted simultaneously to the internal or nut members 177 of both sets of external internal universal joints, with the result that an axial movement will be imparted to the said threaded spindles 179 upward or downward to correspond with the direction of rotation of the gear members 171—171, whereby the respective pairs of wheels 144 and 145 will be elevated or lowered in unison in a substantially vertical plane, such movement upward or downward being under the control of the operator by the control parts, including the connecting rod 162, bell crank 163, control rod 164, leading to a type of a manually operated lever hereinbefore described and shown in Figs. 1 and 2, the same control mechanism being adapted also to cut out the transmission mechanism for elevating or lowering the wheels 144 and 145 from the driven shaft 111.

In order that, in the raising operation just described, the rear main driving wheels 3—3 will be lifted off the road surface together with the rear part of the vehicle as a unit, I have provided a mechanism cooperative with the transmission mechanism just described, for bringing said wheels 3—3 into inextensible linked engagement with the vehicle body during such raising operation, to prevent the expansion of the rear vehicle springs. By inspection of Figs. 1ᴬ and 2ᴬ it will be seen that each forked frame 138 is provided on the rearward arm thereof with a bracket 184 carrying a sprocket gear 185, mounted so that its axis is coincident with that about which the respective forked frames swing. A pair of shafts 186—186, each having a sprocket gear 187 keyed to one end thereof, are journaled one to each side of the chassis 1—1 in the bearings 188 and 189 respectively, said bearings being secured to the chassis frame. The respective sprocket gears 185 and 187 on each side of the chassis, are positioned so that a sprocket chain 190 may be trained around each pair, whereby to impart rotation to the respective shafts 186. Spaced apart from the respective sprocket gears 187 and mounted rotatably on each shaft 186 is a hook 191 positioned so that it may be swingably brought into linked engagement with a link 192, which is rigidly secured to the axle 5 below each hook. A pair of springs 193, fixed each at one end to the respective hook 191 and at the other end to the respective shaft 186, normally hold each hook inclined toward the other at such an angle with a vertical, that said hooks 191—191 in their downward rotation with the forked frames 138 reach a depending position, when the respective pairs of wheels 144 and 145 of the auxiliary device begin engagement with the road surface, the said springs 193—193 then yieldably constraining the hooks to the respective links 192 for the remaining part of the swinging movements of the frames 138 to a substantially vertical position. During the upward swinging movement of the frames 138, when the rear main driving wheels 3—3 come in contact with the road surface and the rear vehicle springs are compressed by the superposed load, the hooks 191—191 are released and swing back to their normal position by the action of frames 138.

By reference to Figs. 1$^A$, 2$^A$, 18, 19, 20, 21, 22 and 23, it will be seen that the transmission mechanism for imparting rotation to the traction wheels of the auxiliary device is mounted in suitable housings supported upon and secured by the auxiliary frame, hereinbefore described, to the chassis 1—1. To either side of the differential mechanism 151 previously referred to, the brackets 194 and 195 secured respectively to the respective bearing blocks 132—132 and to the underside of the cross beams 123 and 124, have journaled therein the power transmission shafts 196—196 in transverse alignment with the oppositely disposed planet gears of the differential mechanism in the casing 151. At the inner end of each of the shafts 196 and fixed thereon, are shown the clutch members 197—197. The shaft 196 each have at their inner ends an extension shaft 196$^a$ having a driving connection with the usual planet gears of the differential mechanism in the casing 151, and at the outer ends of shafts 196$^a$ sockets are in engagement with the pintled ends of shafts 196 and adapted to hold said shafts in alignment.

Coacting clutch members manually operated are shown at 197$^a$, keyed to shafts 196$^a$. 198 designate cam sleeves rotatably mounted, one on each of the coacting clutch members 197$^a$ and each of the cam sleeves has a slip cam face 198$^a$ for coacting with the cam members 199 that constitute the fixed part of the brackets 195. The said cam sleeves, abutting each at one end with the outturned end flange 197$^b$ of the respective coacting clutch members 197$^a$ are yieldably constrained to the cam ends 199 by the springs 200. An arm 198$^b$ fixed to each cam sleeve 198 and pivotally connected to a lever control mechanism, is adapted to impart rotating movement to said cam sleeves and thereby, through the axial movement resulting, move the clutch members 197$^a$ either from engagement or into engagement with the rim of the respective clutch members 197, the said lever controls including the connecting rods 201—201, the arms 202—202 fixed to the counter shaft 203 rotatably mounted on the chassis 1—1, the arm 204 fixed to the shaft 203, the rod 205 connecting arm 204 with bell crank 206, which in turn is mounted on counter shaft 121 and the control rod 206$^a$ leading to a type of a manually operated lever hereinbefore described and shown in Figs. 1 and 2. 197$^c$—197$^c$ designate brake band mechanisms mounted to coact with the rims of the respective clutch members 197, said brake bands being manually operated by a control mechanism not shown but of the type hereinbefore described. It is to be noted at this point, that the worm of the differential mechanism in the casing 151 carried by the driven shaft 111, when not driving, locks the shafts 196$^a$ against rotating and will therefore lock the shafts 196 against rotating or will permit the same to run loose, according as the respective clutches 197 are closed or open. For the sake of simplicity I have shown the usual brake drum mechanism 207—207 connected to the rear main wheels 3—3 of the motor vehicle, as being operable simultaneously with the controls for the cam sleeves 198—198 hereinbefore described, through the medium of the rods 201$^a$—201$^a$ as shown in Fig. 2$^A$, while it is obvious that in the practical application of my invention the controls operable from the driver's seat may be made for actuating the said cam sleeves 198 independently in pairs or singly. Gears 208—208 each fixedly mounted on the outer end of the transverse shafts 196 are in intermeshed engagement respectively with gear members 209 carried by the shafts 210—210, each of which is journaled in the brackets 133 and 135 attached to the respective bearing blocks 132—132. The said shafts 210 are journaled each upon an axis coincident with those about which the respective forked frames 138—138 swing.

The driving shafts 213—213 journaled coaxially with and within the respective hollow journals 141 and also in the respective hubs 130 on the cross braces 131, beyond which the said shafts project, have each provided at the upper end a bevel gear 212 fixedly mounted thereon and in intermeshed engagement with the bevel gear 211 fixedly mounted on the respective shafts 210, and at the lower end thereof are each provided with a bevel gear 214 fixedly mounted thereon and in intermeshed engagement with the bevel gears 215—215 fixedly mounted on the respective axles 143 of the traction wheels 144 and 145 of the auxiliary device. It will now be seen that the transverse power transmission shafts 196—196, when connected to the driven shaft 111 by the differential mechanism in the housing 151 and the extension shafts 196$^a$—196$^a$ they are rotated thereby. Said transverse shafts in turn transmit motion to the respective gear members 215—215 through the medium of the gears 208 mounted on the outer ends of the shafts 196, the gears 209 and 211 on the respective shafts 210, the gears 212 and 214 on the respective driving shafts 213, thus transmitting rotation from the driven shaft to the traction wheels 144—145 of the respective auxiliary traction frames. It will further be clearly seen that, when the hollow journals 141—141 are turned within the hub of the respective forked frames 138—138, they will turn with them the gears 215—215 and the respective pairs of wheels 144 and 145 connected thereto and thus effect the steering of the vehicle without in any way interfering with the rotative effect of the driving shaft. When the wheels are turned to guide the vehicle and the shafts 213 are rotating to propel the vehicle the respective gears 215 swing each about two axes at right angles to each other, one passing through the center of the hollow journal 141 and the other centrally through the gear 215 and the relative movement between the gear 215, gear 214 and the hollow journal 141 of the respective auxiliary traction frames, permitted by this construction, allows the respective traction wheels of the auxiliary device to guide the vehicle without in any way interfering with the rotation thereof; it will be seen also, that the gear transmission mechanism in each bearing block 132 delivering engine power and the gear transmission in the respective swingable forked frames receiving that power, are not interfered with due to any change in the angular position of the vertically swinging frames. Thus this construction permits rotation to be imparted to the traction wheels at such positions as the swingable forked frames may raise or lower them to, and that, when travelling on the road surface, they may be arranged to rotate in all directions, in like direction, in opposite direction, in alternate directions, they may be permitted to run loose or may be held against rotating, all under the control of the operator.

The steering control mechanism is operably actuated, as is best shown in Figs. 1, 1$^A$, 2, 2$^A$, 22, 23, 26 and 27. The shafts 216—216, each rotatably mounted in the brackets 217 attached to the respective forked frames 138—138, have each a worm 218 slidably mounted thereon and in enmeshed engagement with the respective worm gears 146, which are keyed to the respective hollow journals 141. The said worms 218—218 respectively abutting at each end with a coil spring 219 interposing between the respective worm ends and the arm of the respective forked frames 138—138, are held against rotating on the shafts 216—216 by the keys 220 and are yieldably constrained in a central position between the arms of the forked frames. The steering shafts 221 and 222 positioned inside the chassis frame 1—1, one at each side, are journaled respectively upon a substantially fixed axis in the bracket 223 and the brackets 224 and 225, the first two being suitably supported upon and secured to a cross frame 226, which is rigidly fixed to the chassis 1—1 and the last said bracket 225 is shown in Fig. 1 to be suitably fixed to the steering post 77. The rear end of the respective shafts 221 and 222 and the forward end of the shafts 216—216, are coupled slidably, one with the other, on the same side of the vehicle by the extension shaft 228 and the coacting sleeve 228$^a$, which are joined to said ends respectively, by the universal joint members 227, the said shafts 228—228 being provided with a plurality of grooves 229 at the sleeve ends thereof and are held against rotating in the respective sleeves 228$^a$ by a plurality of keys 230 in the interior of last said sleeves. A cross shaft 231 journaled upon a substantially fixed axis in the brackets 223 and 232, which are fixed to said cross frame 226, carries at one end a bevel gear 233, which is in intermeshed engagement with a bevel gear 234 fixedly mounted on the steering shaft 221 and at the other end has a multiple spur gear 235 slidably mounted thereon and held against rotating on said shaft by the key 236, as shown in Fig. 26. The sliding multiple gear 235, which is provided with a hub and a shifter ring 237 loosely mounted thereon in an annular groove, is adapted to be operably brought into alternating engagement with a pair of multiple gear members 238 and 239, each including a spur gear and a bevel gear joined together at the sides and mounted rotatably in transverse axial alignment in the bracket 224 above the cross shaft 231 and disposed on opposite sides of the steering shaft 222, both bevel gear members of the multiple gears 238 and 239 being in intermeshed engagement with a bevel gear 240 fixedly mounted on the steering shaft 222. The lower part of bracket 232 has a round opening interiorly threaded, which is in enmeshed engagement with a threaded spindle 241, whose inner end rotatably engages said shifter ring 237 by an arm 237ª projecting therefrom and is adapted to impart a reciprocable movement to said sliding gear with the shifter ring 237 by its arm along the shaft 231 upon rotating the spindle 241. A lever arm 242 fixed to the spindle 241, connects the latter to a lever control mechanism including the connecting rod 243, bell crank 244 mounted on the counter shaft 121 and the control rod 245, connected by a type of controls hereinbefore described, to a manually operated lever for moving the sliding multiple gear 235 into mesh with the spur gear member of either the multiple gear 238 or 239 or to move said sliding gear from engagement of either of said multiple gears 238 or 239. An auxiliary steering post 247, rotatably mounted in the said bracket 225 and the bracket 248 suitably secured to the steering post 77, carries at the lower end as shown in Fig. 1, a bevel gear 249, which is in mesh with a bevel gear 246 fixedly mounted to the forward end of the steering shaft 222, and at the upper end the auxiliary steering post carries a spur gear 250, which is in enmeshed engagement with a gear 251 rotatably mounted on the steering post 77, the said gear 251 being provided with a hub upon which a manually operated steering wheel 252 is securely supported. It will now be understood, that upon rotating the steering wheel 252, both steering shafts 221 and 222, are rotated through the medium of the gear 251, the gears 250 and 249 on the auxiliary post 247, the gears 246 and 240 on shaft 222, the interposing multiple gears 238 and 239, the sliding gear 235 and gear 233 on cross shaft 231 and the gear 234 on shaft 221, whereby the respective pairs of wheels 144 and 145 of the auxiliary device are turned laterally about the axis of the respective hollow journals 141 through the medium of the extensible steering members 228—228ª, which are adapted to oscillate therewith and whose lengths adapt themselves to the varying angles of inclination assumed by the swingable frames 138—138, also, through the respective worms 218 on the shafts 216 and their intermeshed worm gears 146, the said turning movement imparted to the respective pairs of power-driven steering wheels 144 and 145 being at any angle in unison in one direction, in unison in the opposite direction, the same mechanism imparting turning movement to the last said wheels (144 and 145) in one traction frame at any angle in one direction, the wheels (144 and 145) in the other traction frame turning in unison in the reverse direction, according as the sliding gear 235 meshes with one or the other of the multiple gears 238 and 239. When sliding gear 235 is so set as to mesh with neither gear 238 or 239 (Figures 26 and 27), the turning of steering wheel 252 will not drive shafts 231 and 221 but only shaft 222. This will give steering motion to only one of the traction frames enabling it to be turned 180 degrees with respect to the other traction frame on the opposite side of the vehicle. The effect of this is to move bevel gear 215 to the opposite side of its mate 214 (Figure 23) for one pair of wheels 144 and 145 from what it is for the other pair of wheels. This means that when both clutches 197ª are brought into engagement, that one pair of said wheels will be driven in the opposite direction from the other pair. Also, the construction shown imparts steering adjustment yieldably to the wheels and cumulatively or by reversal of the steering mechanism at will, in addition permitting each wheel of the respective pairs of wheels 144 and 145 in their downward movement to engage an even or uneven road surface by reason of said respective pairs of wheels pivoting with the hollow journal 141 against the force of the springs 219 until each wheel bears on the road surface. It is obvious that by suitable modification the auxiliary device could be arranged to operate with a single wheel in each traction frame or with a plurality thereof.

The auxiliary traction and steering device hereinbefore shown and described as being operated to swing transversely of a motor vehicle, is illustrated in Figs. 11, 12 and 13 in its application to such vehicle to be operated to swing longitudinally. Fig. 12 shows a fragmentary top plan view of the left half of the auxiliary device and Fig. 11 a longitudinal section of the chassis exposing the transmission mechanism of the auxiliary device, it being understood that the device here shown is of substantially the same construction on one side of the chassis as on the other. The driven shaft 111ª deriving the engine power as before and shown in Figs. 1 and 2, carries it to the auxiliary traction and steering device to the rear of the rear main driving wheels 3—3. To an auxiliary frame of cross beams 123ª, 124ª and 125ª, embraced by the plate 127ª and rigidly fixed to the chassis 1—1 by the brackets 126ª as shown, there are mounted a pair of oppositely disposed bearing blocks 132ª—132ª on the under side of the cross beams 123ª and 124ª, each secured thereto by a pair of brackets 253—253 outside the side beams of the chassis 1—1. Similar to the construction of the bearing blocks hereinbefore described and shown best in Figs. 22 and 23, the bearing blocks 132ª—132ª have each projecting a journal from each of a pair of brackets, which are here shown arranged in transverse coaxial alignment, the inner of the two journals of each bearing block 132ª being hollow, as shown in Fig. 13. Journaled to the journals of each bearing block 132ª and arranged each to oscillate thereon substantially vertically, are the forked frames 138ª, each of said forked frames with its respective pair of traction wheels 144ª and 145ª being substantially of the same construction as shown best in Figs. 22 and 23 and hereinbefore described. As before, the construction of the forked frames 138ª—138ª together with their respective pairs of wheels 145ª is such, relative to the rear main driving wheels of the motor vehicle, that, when said forked frames are forced downwardly into vertical position as indicated in part in Fig. 11 the respective pairs of wheels one of which is shown at 145ª are brought into engagement with the road surface, at the same time elevating the rear main wheels 3—3 from the road surface and imparting a slight tilt to the chassis 1—1. The said driven shaft 111ª like the driven shaft 111 previously referred to, is provided with a worm which engages the master gear of a differential mechanism of the usual construction, the said differential mechanism being housed in a casing 151ª and secured to the auxiliary frame as shown in Fig. 11. The gear transmission and control mechanisms connected to the driven shaft 111ª and to the counter shaft 152ª to the rear of the differential mechanism housing 151ª is substantially like that hereinbefore described and shown in Figs. 18, 19, 20 and 21. As before the last said transmission mechanism delivers the engine power by the gear member 155ª to the transmission mechanism for elevating or lowering the traction wheels of the auxiliary device. By now referring to Figs. 11 and 12 it will be seen that the last said transmission mechanism is mounted in a pair of two part housings oppositely disposed and positioned outside the side beams of the chassis 1—1, the respective sections 165ᵇ and 166ᵇ of which, are suitably supported upon and secured by the auxiliary frame to the chassis 1—1. The said sections, when joined together as shown, provide a bearing each at 256 for the outer end of a pair of transversely aligned power transmission shafts 254—254, the said shafts at the inner end being journaled each in the bearings 256ª—256ª rigidly secured to the plate 127ª. 257—257 designate bevel gears mounted fixedly to the inner end of the respective shafts 254. A short vertical shaft 258 journaled in a projecting arm of the bracket 154ª, has at the upper end a bevel gear 259 fixedly mounted thereon and in enmeshed engagement with the bevel gears 257—257 and at the lower end carries a bevel gear 260 in mesh with the bevel gear 155ª from which it receives power. A pair of bevel gears 255—255, each fixedly mounted at the outer end of the respective transverse shafts 254, deliver power to the transmission mechanism within the housings 165ᵇ—165ᵇ for elevating or lowering the wheels of the auxiliary device. The said gears 255, herein intermeshed engagement with the respective annular bevel gears 171ª as shown in Fig. 12, actuate the respective transmission mechanisms positioned within the said annular bevel gears 171ª, and with them the swingable frames on which the wheels of the auxiliary device are mounted, it being understood that the transmission mechanisms within the annular bevel gears inside their respective housings, are substantially the same as hereinbefore described and best shown in Figs. 24 and 25 with the exception, that the annular spur gear 171 is here replaced by the said annular bevel gear 171ª. The coacting mechanism for bringing the rear main driving wheels 3—3 into linked engagement with the vehicle body, when elevated above the road surface, is like before actuated by the respective swingable frames 138ª—138ª through the medium of the transmission shafts 186ª—186ª. A pair of bevel gear sectors 261—261 each fixed to the inner arm of the respective forked frames 138ª—138ª and mounted to swing coaxially with the axis about which the said respective frames swing, is in enmeshed engagement with a bevel gear 262 fixedly mounted on the rear end of the respective shafts 186ª and delivering power thereto. The construction of this coacting mechanism shown in Figs. 11, 12 and 13 at the forward end of the respective shafts 186ª—186ª is substantially like that hereinbefore described and shown in Fig. 1ᴬ and Fig. 2ᴬ.

The transmission mechanism for imparting rotation to the traction wheels of the auxiliary device shown in Figs. 11, 12 and 13 derives its power and operates in a manner similar to that which has hereinbefore been pointed out and shown in Figs. 18, 19, 20, 22 and 23. A pair of power transmission shafts 196ᵇ—196ᵇ, one to either side of the differential mechanism in the housing 151ª previously referred to, and arranged in transverse alignment with the oppositely disposed planet gears of said differential mechanism, are journaled each at the inner end in the respective brackets 195ª and at the outer end in the outer bracket of the respective bearing blocks 132ª—132ª similar to that shown at 135 in Figs. 22 and 23. The said shafts each pass through the hollow in the inner journal of the bearing blocks previously referred to and are mounted each to rotate coaxially with the axis about which the respective forked frame 138ª swings, as shown in Fig. 13. The operating connection of said transverse shafts 196ᵇ with the differential mechanism in the housing 151ª and the lever control mechanism therefor, is like that previously described and shown in Figs. 18, 19 and 20, while the driving connections of the respective transverse shafts 196ᵇ with the respective pairs of traction wheels 144ª and 145ª are substantially like that hereinbefore described and clearly shown in Figs. 22 and 23.

As before, the steering control mechanism is also here operably actuated. By referring to Figs. 11, 12 and 13 it will be seen that the shafts 216ª—216ª respectively journaled in the swingable frames 138ª—138ª, carry a bevel gear 263 at the inner ends thereof, the said gears being positioned on said shafts outside the arms of the respective forked frames. A short shaft 264 mounted to rotate in a bearing 265 attached to the inner arm of the respective forked frames 138ª—138ª, carry each at the lower end a bevel gear 266 in mesh with the respective bevel gears 263, and at the upper end carry a bevel gear 267. The said gears 267—267 are in mesh with the bevel gears 268, which are mounted each to rotate on a hub 269 projecting from the inner end of the respective bearing blocks 132ª—132ª and whose axes are coincident with those about which the respective forked frames swing. Two steering shafts 221ª and 222ª positioned inside the chassis frame 1—1, one at each side, are journaled respectively at the rear ends thereof upon a substantially fixed axis in the respective brakets 271—271, which are suitably supported upon and secured by the cross frame 272 to the chassis frame 1—1. Extension shafts 270—270, journaled each near their rear end in the respective bearings 274—274 attached to the side beams of the chassis 1—1, are connected each at the forward end by a universal joint 273 to the steering shafts 221ª and 222ª respectively and at the rear end said extension shafts have each a bevel gear 275 fixedly mounted thereon and in enmeshed engagement with the respective rotatable gears 268, it being understood that the steering shafts 221ª and 222ª connect by the foreparts thereof to an operable steering control mechanism, which is substantially like that hereinbefore described and shown in Figs. 1, 1ᴬ, 2, 2ᴬ, 26 and 27. It will be understood from the foregoing that upon rotation of the steering shafts 221ª and 222ª by a manually operated steering wheel like that shown at 252, Fig. 1, the respective pairs of traction wheels 144ª and 145ª of the auxiliary device are turned laterally, as before, about the axis of the respective hollow journals through the medium of the gears 275 on the shafts 270, the gears 268, gears 267, which are adapted to oscillate with the swingable frames while in operative engagement with the respective gears 268, also the gears 266, which together with the gears 267 are mounted on the shafts 264, gears 263, the respective worms on the shafts 216ª and their intermeshed worm gears, the said steering movement imparted to the respective pairs of power-driven steering wheels 144ª—145ª being substantially like that previously described and shown in connection with the respective pairs of wheels 144 and 145.

As hereinbefore stated other types of power transmission mechanism for elevating or lowering the wheels of my improved auxiliary traction and steering device are shown and described in their application to a motor vehicle as illustrated in Figs. 28 to 42, both inclusive. For the purpose of imparting rotation to said wheels, I have employed, as before, a cooperative transmission mechanism substantially like that hereinbefore described in connection with one type of power transmission mechanism for elevating or lowering the wheels of the auxiliary device. The steering control mechanism employed in the types of the auxiliary device here referred to, is also similar to that hereinbefore described.

Taken in the order just enumerated, the type of the device shown in Figs. 28, 29 and 30 shows the driven shaft 111ᵇ, which derives the engine power like that described before and shown in Figs. 1 and 2, carrying that power to the auxiliary traction and steering device forward of the rear main driving wheels 3—3. To an auxiliary frame of cross beams 123ᵇ, 124ᵇ and 125ᵇ, braced by the plate 127ᵇ and rigidly fixed to the chassis 1—1 by the brackets 126ᵇ as shown, there are journaled at the bearing blocks 132ᵇ—132ᵇ a pair of oppositely disposed swingable frames 138ᵇ—138ᵇ provided with their respective pairs of traction wheels 144ᵇ and 145ᵇ, the said swingable frames together with their respective traction wheels being positioned, constructed and operated in a manner substantially like that hereinbefore described and shown in Figs. 1, 1ᴬ, 2, 2ᴬ, 22 and 23. Here also the construction of the forked frames 138ᵇ—138ᵇ is such, relative to the rear main driving wheels of the motor vehicle, that, when said forked frames are forced downwardly into vertical position, as is shown in Fig. 28, the respective pairs of wheels 144ᵇ and 145ᵇ are brought into engagement with the road surface and at the same time elevate the rear main wheels 3—3 from the road surface, like that previously described and shown in Figs. 1ᴬ and 17. A slight camber in the side beams 1—1 will help to offset the effects of the tilt to the chassis 1—1. It should be stated at this point, that the respective pairs of wheels 144ᵇ and 145ᵇ of the auxiliary traction and steering device may, with proper modification, be arranged to swing longitudinally in a manner similar to that previously described and shown in Figs. 11, 12 and 13. The said driven shaft 111ᵇ, like the driven shaft 111 previously referred to, is provided with a worm, which engages the master gear of a differential mechanism of the usual construction, the said differential mechanism being housed in a casing 151ᵇ and secured to the auxiliary frame as shown in Fig. 29. The gear transmission and control mechanisms connected to the driven shaft 111$^b$ and to the counter shaft 152$^b$ to the rear of the differential mechanism housing 151$^b$, is substantially like that hereinbefore described and shown in Figs. 18, 19, 20 and 21. Like that previously described and shown, the last said transmission mechanism delivers the engine power by the gear member 155$^b$ to the transmission mechanism for elevating or lowering the traction wheels of the auxiliary device. By now referring to Figs. 28, 29 and 30, it will be seen that the last said transmission mechanism is mounted in a suitably braced supporting frame positioned centrally inside the chassis 1—1. The said supporting frame includes two brackets 276 and 276$^a$, arranged transversely, projecting downwardly and are rigidly secured to the plate 127$^b$, the bracket 276$^a$ having journaled therein at 277 one end of the counter shaft 152$^b$, which projects into the space between said brackets and carries the bevel gear 155$^b$. A bearing plate 278 is positioned above the plate 127$^b$ and is suitably secured and supported thereon by a plurality, preferably four posts 279 and the bracing members 280. A threaded spindle 281 having a shank at each end is journaled parallel with and centrally between the said posts upon a substantially vertical axis at the upper end in the plate 278 at 282 and at the lower end in a bearing 283 in the plate 127$^b$, the said lower end projecting below the plate 127$^b$ and carrying a bevel gear 284, which meshes with the bevel gear 155$^b$ from which it receives power. Flanges 281$^a$ and 281$^b$ thereon prevent axial displacement of the spindle 281. 285 designates a carriage plate having a round opening centrally positioned at 286 and interiorly threaded and within which, the threaded spindle 281 operates and is at times in enmeshed engagement. The holes at 287, as shown in Fig. 30, are slidably engaged by the respective posts 279, at whose terminals coil springs 288 are mounted, the outer ends thereof being fixed to the respective plates 278 and 127$^b$. The shanks of the threaded spindle are each adapted to accommodate the carriage plate 285 and to rotate therein at the end of each reciprocation of the reciprocable plate 285, said plate in these terminal positions acting against the force of the springs 288 at the respective ends, whereby that plate is constrained to confront enmeshing with the threaded spindle at the end of each reciprocation, as is best shown in Figs. 28 and 29. The sleeves 289, one mounted outside each spring 288 and fixed to the respective plates 278 and 127$^b$, serve to retain the respective springs and to prevent their crushing. A pair of arms 290—290, each provided at one end with a hub 291, are journaled each upon a shaft 292 mounted in the projecting bracket arms 293 of the respective brackets 276 and 276$^a$. A pair of link arms 294—294 each pivotally connected at one end to the lower part of the respective swingable frames 138$^b$ and adapted to oscillate therewith, engage pivotally at the other end by the pins 295 the projecting ends of the respective arms 290 with which they are also adapted to oscillate. 296—296 designate a pair of operating arms each journaled at one end to the opposing ends 297 of the carriage plate 285 and are adapted to swing thereon and are movably supported thereby. At the projecting end, which is forked, the arms 296—296 each engage pivotally the respective pivotal pins 295, the said forked end straddling the ends of the arms 290 and 294 and adapted to oscillate with the last said arms about the respective pins 295. It will now be seen that the engine power in the driven shaft 111$^b$, when transmitted through the medium of the bevel gear 155$^b$ to the bevel gear 284, that a rotary movement will be imparted to the threaded spindle 281, with the result that an axial movement will be imparted to the carriage plate 285 up or down to correspond with the direction of rotation of the threaded spindle 281, the said carriage plate coming to a stop automatically, when the same leaves the thread at the shanks at the end of each reciprocation. The arms 296 are thus simultaneously actuated and are elevating or lowering the respective pairs of wheels 144$^b$ and 145$^b$ in unison in a substantially vertical plane, such movement upward or downward being under the control of the operator by a lever control mechanism, like that hereinbefore described and generally shown in Figs. 1, 1$^A$, 2 and 2$^A$. Similar to that previously shown and described, the coacting mechanism, for linking the depending rear main driving wheels 3—3 to the vehicle body, when the latter is being elevated or lowered over the road surface, is actuated by the swingable frames 138$^b$—138$^b$ through the medium of sprocket chains corresponding to those designated 190 and shown in Figs. 1$^A$ and 2$^A$.

The transmission mechanism for imparting rotation to the respective pairs of traction wheels 144$^b$ and 145$^b$ of the auxiliary device shown in Figs. 28 and 29, derives its power in a way similar to that previously pointed out and is positioned, constructed and operated in a manner substantially like that hereinbefore described and shown in Figs. 1, 1$^A$, 2, 2$^A$, 18, 19, 20, 21, 22 and 23.

The steering control mechanism for imparting steering adjustment to the respective pairs of traction wheels 144$^b$ and 145$^b$ of the auxiliary device shown in Figs. 28 and 29, is operably actuated in a way similar to that previously pointed out and is also positioned, constructed and operated in a manner substantially like that hereinbefore described and shown in Figs. 1, 1$^A$, 2, 2$^A$, 17, 21, 22, 23, 26 and 27.

Next in the order of the types of the auxiliary traction and steering device hereinbefore enumerated, is that illustrated in Figs. 31, 32, 33, 34 and 35. The driven shaft 111ᶜ deriving the engine power in a way similar to that previously described and shown in Figs. 1 and 2, carries that power to the auxiliary traction and steering device forward of the rear main driving wheels 3—3. To an auxiliary frame of cross beams 123ᶜ, 124ᶜ and 125ᶜ, braced by the plate 127ᶜ and rigidly fixed to the chassis 1—1 by the brackets 126ᶜ as shown, there are journaled at the bearing blocks 132ᶜ—132ᶜ a pair of oppositely disposed swingable frames 138ᶜ—138ᶜ provided with the respective pairs of traction wheels 144ᶜ and 145ᶜ, the said swingable frames together with their respective traction wheels being positioned, constructed and operated in a manner substantially like that hereinbefore described and shown in Figs. 1, 1ᴬ, 2, 2ᴬ, 22 and 23. The construction of the forked frames 138ᶜ—138ᶜ together with their respective pairs of wheels 144ᶜ and 145ᶜ is such, relative to the rear main driving wheels of the motor vehicle, that, when said forked frames are forced downwardly into vertical position as shown in Fig. 31, the respective pairs of wheels 144ᶜ and 145ᶜ are brought into engagement with the road surface and at the same time elevate the rear main wheels 3—3 from the road surface, like that previously described and shown in Figs. 1ᴬ and 17. A slight camber in the side beams 1—1 will help to offset the effects of the tilt to the chassis 1—1. It should also be seated at this point that the respective pairs of wheels 144ᶜ and 145ᶜ of the auxiliary traction and steering device may, with proper modification, be arranged to swing longitudinally in a manner similar to that previously described and shown in Figs. 11, 12 and 13. The said driven shaft 111ᶜ, like the driven shaft 111 previously referred to, is provided with a worm, which engages the master gear of a differential mechanism of the usual construction, the said differential mechanism being housed in a casing 151ᶜ and secured to the auxiliary frame as shown in Fig. 32. The gear transmission and control mechanisms connected to the driven shaft 111ᶜ and to the counter shaft 152ᶜ to the rear of the differential mechanism housing 151ᶜ, is substantially like that hereinbefore described and shown in Figs. 18, 19, 20 and 21. Similar to that previously pointed out the last said transmission mechanism delivers the engine power by the gear member 155ᶜ to the transmission mechanism for elevating or lowering the traction wheels of the auxiliary device. By reference to Figs. 31, 32, 33, 34 and 35, it will be seen that the last said transmission mechanism is mounted in a centrally positioned supporting frame upon the chassis 1—1. The said supporting frame includes two brackets 298 and 299, arranged transversely, projecting downwardly and are rigidly secured to the cross beams 124ᶜ and 125ᶜ respectively, the bracket 298 having journaled therein at 300 one end of the counter shaft 152ᶜ, which projects into the space between said brackets and carries the bevel gear 155ᶜ. A pair of oppositely disposed brackets 301—301 and a pair of brackets 302—302 also disposed oppositely and severally suitably supported upon and secured to the auxiliary frame as shown, provide a bearing each for the inner and outer ends respectively, of a pair of transversely aligned threaded spindles 303—303 having a shank 303ᵃ at each end. The inner ends of the respective spindles 303 project beyond their respective bracket bearings within the space between them, where said ends both abut with a thrust bearing 304, which is retained by a sleeve 305 loosely engaging the inner ends of the spindles 303. The thrust collars 306—306 at the inner end of the bearings of the brackets 301 and mounted on the respective spindle shanks, prevent axial displacement of said spindles. A pair of bevel gears 307—307, each fixedly mounted on the inner end of the respective threaded spindles 303, are in mesh with the bevel gear 155ᶜ from which they receive power. 308—308 designate a pair of rider mechanisms provided each with a nut extension 309 within which the respective threaded spindles 303 operate and are each at times in enmeshed engagement. Rotatably mounted on the upper part of each rider mechanism 308 are a plurality, preferably three rollers 308ᵃ, shown best in Figs. 31, 33 and 35, which revolubly engage vertically over each threaded spindle 303 a supporting rail 310 mounted in the respective pairs of brackets 301 and 302 on an axis parallel with those of the respective spindles 303. The shanks 303ᵃ of last said spindles are each adapted to receive a coil spring 311 together with a slidable abutting collar 312 and also accommodate the respective rider mechanisms 308 and to rotate therein at the end of each reciprocation of the reciprocable rider mechanism 308, the said rider mechanism in these terminal positions acting against the force of the springs 311 at the respective ends, whereby the rider mechanism is constrained to confront enmeshing with the threaded spindle at the end of each reciprocation, as is best shown in Figs. 31 and 33. A lever arm and gear transmission mechanism for actuating the swingable frames 138ᶜ interposes between the threaded spindles, 303 and said swingable frames. A pair of shafts 313 and 314 are rotatably mounted in each of the projecting bracket arms 315 of the respective brackets 298 and 299. A pair of geared sectors 316—316, each journaled on the respective shafts 313 and provided with a forked lever arm 317, have the respective forked ends 318 thereof engaging rollers 319 in the roller heads 320, said roller heads being oppositely disposed and swivelly engaging the sides of the respective rider mechanisms 308. Another pair of geared sectors 321, journaled each on the respective shafts 313, are provided respectively with a lever arm 322. Multiple gears 323—323 are each fixedly mounted on the respective shafts 314, the spur gears 325—325 of which, are each adapted to mesh with the respective geared sectors 321, while the spur gears 324 of less diameter, are each adapted to mesh with the respective geared sectors 316. A pair of link arms 326—326 each pivotally connected at one end to the lower part of the respective swingable frames 138$^c$ and adapted to oscillate therewith, engage pivotally at the other end with the projecting end of the lever arm 322 of the respective geared sectors 321, with which they are also adapted to oscillate. The diameters of the gears 324 and the gears 325 are so proportioned, that in their operation for elevating or lowering the respective pairs of traction wheels 144$^c$ and 145$^c$, the total angular displacement of each of the lever arms 322 from one end of the stroke to the other end, is effected in the same period of time as it takes each of the lever arms 317 to effect the angular displacement from one end of its corresponding stroke to the other end, as is illustrated in Fig. 31, wherein the pairs of lever arms 317, 322 and 326 and the swingable frames 138$^c$ with their traction wheels, are shown in dotted lines in the upper terminal positions. It will now be understood that the engine power in the driven shaft 111$^c$, when transmitted through the medium of the bevel gear 135$^c$ to the bevel gears 307—307, that a rotary movement will be imparted simultaneously to the respective threaded spindles 303 with the result, that an axial movement will be imparted to the rider mechanism 308 on each threaded spindle in one direction or in the opposite direction to correspond with the direction of rotation of the spindles 303—303, the said rider mechanisms coming to a stop automatically, when the same leave the thread at the shanks 303$^a$ at the end of each reciprocation, it being understood that the rider mechanisms are actuated in opposing directions, whereby equal angular movements are simultaneously imparted to the lever arms 317 and are thus elevating or lowering the respective pairs of wheels 144$^c$ and 145$^c$ in unison in a substantially vertical plane, such movement upward or downward being under the control of the operator by a lever control mechanism like that hereinbefore described and generally shown in Figs. 1, 1$^A$, 2 and 2$^A$. Similar to that previously pointed out, the coacting mechanism, for linking the depending rear main driving wheels 3—3 to the vehicle body, when the latter is being elevated or lowered over the road surface, is actuated by the swingable frames 138$^c$—138$^c$ thru the medium of sprocket chains corresponding to those designated 190 and shown in Figs. 1$^A$ and 2$^A$.

The transmission mechanism for imparting rotation to the respective pairs of traction wheels 144$^c$ and 145$^c$ of the auxiliary device shown in Figs. 31, 32, 33, 34 and 35, derives its power in a way similar to that previously pointed out and is positioned, constructed and operated in a manner substantially like that hereinbefore described and shown in Figs. 1, 1$^A$, 2, 2$^A$, 18, 19, 20, 21, 22 and 23.

The steering control mechanism for imparting steering adjustment to the respective pairs of traction wheels 144$^c$ and 145$^c$ of the auxiliary device shown in Figs. 31, 32, 33, 34 and 35 is operably actuated in a way similar to that previously pointed out and is also positioned, constructed and operated in a manner substantially like that hereinbefore described and shown in Figs. 1, 1$^A$, 2, 2$^A$, 17, 21, 22, 23, 26 and 27.

Another of the types of the auxiliary traction and steering device hereinbefore enumerated is that illustrated in Figs. 36, 37, 38, 39, 40, 41 and 42. The driven shaft 111$^d$ deriving the engine power in a manner like that previously described and shown in Figs. 1 and 2, carries that power to the auxiliary traction and steering device forward of the rear main driving wheels 3—3. To an auxiliary frame of cross beams 123$^d$, 124$^d$ and 125$^d$, braced by the plate 127$^d$ and rigidly fixed to the chassis 1—1 by the brackets 126$^d$ as shown, there are journaled at the bearing blocks 132$^d$—132$^d$ a pair of oppositely disposed swingable frames 138$^d$—138$^d$ provided with the respective pairs of traction wheels 144$^d$ and 145$^d$, the said swingable frames together with their respective traction wheels being positioned, constructed and operated in a manner substantially like that hereinbefore described and shown in Figs. 1, 1$^A$, 2, 2$^A$, 22 and 23. The construction of the forked frames 138$^d$—138$^d$ together with their respective pairs of wheels 144$^d$ and 145$^d$ is such, relative to the rear main driving wheels of the motor vehicle, that, when said forked frames are forced downwardly into vertical position as shown in Fig. 36, the respective pairs of wheels 144$^d$ and 145$^d$ are brought into engagement with the road surface and at the same time elevate the rear main wheels 3—3 from the road surface, like that previously described and shown in Figs. 1$^A$ and 17. A slight camber in the side beams 1—1 will help to offset the effects of the tilt to the chassis 1—1. It should be stated also at this point, that the respective pairs of wheels 144$^d$ and 145$^d$ of the auxiliary traction and steering device, may with proper modification, be arranged to swing longitudinally in a manner similar to that previously described and shown in Figs. 11, 12 and 13. The said driven shaft 111$^d$, like the driven shaft 111 previously referred to, is provided with a worm, which engages the master gear of a differential mechanism of the usual construction, the said differential mechanism being housed in a casing 151$^d$ and secured to the auxiliary frame as shown in Fig. 39. The gear transmission and control mechanisms connected to the driven shaft 111$^d$ and to the counter shaft 152$^d$ to the rear of the differential mechanism housing 151$^d$, is substantially like that hereinbefore described and shown in Figs. 18, 19, 20 and 21. Similar to that previously pointed out the last said transmission mechanism delivers the engine power by the gear member 155$^d$ to the transmission mechanism for elevating or lowering the traction wheels of the auxiliary device. By reference to Figs. 36, 37, 38, 39, 40, 41 and 42, it will be seen that the last said transmission mechanism is mounted in a pair of housings oppositely disposed and positioned one at each side of the chassis 1—1, the respective casings 327 and brackets 328 of which, are suitably supported upon and secured by the auxiliary frame to the chassis 1—1. The said casings as shown, provide bearings each at 329 and at 330 respectively, for the inner end and outer end of a pair of transversely aligned power transmission shafts 331—331, the inner end of the shafts 331 projecting beyond their respective casings in the space between them, where said ends both abut with a thrust bearing 332, which is retained by a sleeve 333 loosely engaging the inner end of the shafts 331. The thrust collars 334—334 mounted on the respective shafts 331 at the bearings 329, prevent axial displacement of said shafts. A pair of bevel gears 335—335, each fixedly mounted on the inner end of the respective shafts 331, are in mesh with the bevel gear 155$^d$ from which they receive power. 336—336 designate a pair of hollow worms, one mounted loosely on each of the shafts 331 and positioned centrally within each casing 327, the said hollow worms abutting each at their respective ends with an annulus 337 interiorly threaded and engaging the respective shafts 331 by an external thread 338, a pin 340 holding said annuluses against rotation on said shafts. A tooth 339 is provided at each end of the respective hollow worms 336 and is adapted to coact each with a clutch member to be hereinafter described, the tooth at one end of each hollow worm confronting for one direction of rotation of said worm, while the tooth on the other end of the same worm confronts for the opposite direction of rotation thereof, the said teeth being positioned outside the annuluses 337, as shown best in Fig. 37. A pair of clutch members are slidably mounted on each shaft 331, one clutch member at each end of the respective worms 336, and the hub of each clutch member is held against rotating on said shafts by a key 341. The said clutches each include a hub 342, slidable on the respective shafts and keyed thereon and a drum 343 surrounding the hub and having a disk-like end, which turns loosely on the hub. A pair of projecting flanges on the hub accommodate between them a plurality, preferably three pawls 344, that are pivotally mounted thereon by the pins 345 and their projecting ends are yieldably constrained against the interior wall of the drum and are adapted to coact with the surrounding drum 343 at the notches 346 in one direction of rotation of the hub 342, while in a rotation of said hub in the opposite direction, the pawls 344 will yieldably slide over the interior wall of the drum. The drum 343 at the open end, has secured to it a disk-shaped member 347 by a plurality of screws 348, the said disk 347 being of a larger diameter than the adjacent drum and loosely bears on the hub 342, while at the other end, the drum 343 has an outturned flange 349 and a projecting tooth 350 provided with an antifriction roller 350$^a$ on the confronting face thereof. The said tooth 350, upon axial movement of the clutch member into contact with the worm 336, is adapted for locked engagement with the tooth 339 of the worm in one direction of rotation of said clutch and, in a rotation of said clutch member in the opposite direction, said clutch at that end, is adapted to slide over the respective end of the worm 336 and is axially displaced thereby, it being understood that on each shaft 331, the clutch pawls 344 at one end thereof effectively engage the surrounding clutch drum 343 in one direction of rotation of said shaft, while the clutch pawls at the other end of the same shaft effectively engage their surrounding clutch drum in a rotation of said shaft in the opposite direction. The outside face of the drum 343 of each clutch, between the flange 349 and the drum cover 347, is adapted to receive a spring 351 together with a slidable abutting collar 352 and also accommodates a shifter yoke 353 slidably mounted thereon and interposing between the drum cover 347 and the abutting collar 352, as shown in Figs. 36, 37 and 38. The said shifter yoke 353, when operated by a bell crank transmission mechanism, which is connected to the respective swingable frames 138$^d$ and to be hereinafter described, imparts an axial movement to the respective clutch members in one direction or in the opposite direction. The strokes, which bring the said clutches into contact with the respective worm ends, through the force of the springs, yieldably constrain the clutches to the worm ends. A pair of shafts 354—354, one journaled in each casing 327 and its adjacent bracket 328 and positioned below the respective transverse shafts 331, have each fixedly mounted thereon a worm gear 355, within the respective casings 327, which is in enmeshed engagement with the respective worms 336 and have also fixedly mounted thereon a spur gear 356 between the casing and the bracket as shown in Figs. 36 and 40. 357—357 designate geared sectors rigidly secured, one to each swingable frame 138$^d$, at the hub and at the arms thereof by the respective brackets 358 and the said sectors 357, whose axes are coincident with those about which the respective frames 138$^d$—138$^d$ swing, are arranged to mesh with the respective spur gears 356, as shown in Figs. 36 and 40. A bell crank transmission mechanism, for moving each pair of clutch members along the respective transverse shafts 331 in their operation with the respective worms 336, interposes between each pair of said clutch members and the respective swingable frame 138$^d$, as shown in Figs. 36, 41 and 42. A pair of rods 359—359, one mounted within each casing 327 to slide on an axis parallel with the axis of the respective transverse shaft 331, project each beyond the outer end of the respective casings and are provided each at that end with an eye or loop 360, as is shown best in Figs. 36, 41 and 42. Secured to each rod 359 are the shifter yokes 353—353 of the last said clutch members on the respective shafts 331. Each swingable frame 138$^d$ has secured to the forward arm thereof a cam 361 provided with a curved slot 362, the center of the curvature thereof being coincident with the axis about which the respective frames 138$^d$ swing. A pair of bell cranks 363—363, each pivotally mounted by the hub to the outer end of the respective casings 327, are each provided at the end of one arm thereof with a pin 364, which engages the slot of the respective cams 361, the said pin being stationary therein for a part of each oscillation of the swingable frame 138$^d$ and for the remainder of that oscillation, when the pin 364 abuts at the end of the slot, the said slotted cam constrains the bell crank 363 to oscillate therewith in one direction or in the opposite direction. At the end of the other arm, which is forked, the bell cranks 363 each have elongated openings and engage a pin 365, which is secured in the eye end of the respective rods 359, the said openings being elongated so that an angular movement of the bell cranks 363 will impart an axial displacement to the respective rods 359 and therefore to the respective clutches on the shafts 331, in one direction or in the opposite direction, such movement in one direction or in the opposite direction being against the force of the clutch springs 351 to bring one of the clutches on each shaft into engagement with the respective worm ends and to move the other clutch on each shaft 331 from engagement of the other worm ends, as is shown in Figs. 36, 37, 38, 41 and 42. It will now be seen that the engine power in the driven shaft 111$^d$, when transmitted through the medium of the bevel gear 155$^d$ to the bevel gears 335—335, that a rotary movement will be imparted simultaneously to both transverse shafts 331 and these in turn transmitting this movement to the respective worms 336 through the clutch members at the inner end or outer end of the respective shafts 331, according as the downward or upward movement of the swingable frames 138$^d$ bring the inner pair or outer pair of clutch members into locked engagement with the respective ends of the worms 336, it being understood that the last part of each oscillation of each swingable frame 138$^d$ disengages the clutch member, which had driven the respective swingable frame to that stroke's end and at the same time engages a clutch member at the other end of the respective worms for driving the swingable frame in the opposite direction, when the rotation of the shafts 331 is reversed by the bevel gear 155$^d$. The rotation in the worms 336 results in rotation of the respective worm gears 355—355 and therefore in the pair of spur gears 356—356, whose rotation in the arrangement shown, is imparted simultaneously in opposing directions, whereby equal angular movements are imparted to the sectors 357 upward or downward to correspond with the direction of rotation of the worms 336, thus elevating or lowering the respective pairs of wheels 144$^d$ and 145$^d$ in unison in a substantially vertical plane, such movement upward or downward being under the control of the operator by a lever control mechanism like that hereinbefore described and generally shown in Figs. 1, 1$^A$, 2 and 2$^A$. Similar to that previously pointed out, the coacting mechanism for linking the depending rear main driving wheels 3—3 to the vehicle body, when the latter is being elevated or lowered over the road surface, is actuated by the swingable frames 138$^d$—138$^d$ at the brackets 184$^d$ through the medium of sprocket chains corresponding to those designated 190 and shown in Figs. 1$^A$ and 2$^A$.

The transmission mechanism for imparting rotation to the respective pairs of traction wheels 144$^d$ and 145$^d$ of the auxiliary device shown in Figs. 36, 37, 38, 39, 40, 41 and 42, derives its power in a way similar to that previously pointed out and is positioned, constructed and operated in a manner substantially like that hereinbefore described and shown in Figs. 1, 1$^A$, 2, 2$^A$, 18, 19, 20, 21, 22 and 23.

The steering control mechanism for imparting steering adjustment to the respective pairs of traction wheels 144$^d$ and 145$^d$ of the auxiliary device shown in Figs. 36, 37, 38, 39, 40, 41 and 42, is operably actuated in a way similar to that previously pointed out and is also positioned, constructed and operated in a manner substantially like that hereinbefore described and shown in Figs. 1, 1<sup>A</sup>, 2, 2<sup>A</sup>, 17, 21, 22, 23, 26 and 27.

Fig. 9 and Fig. 10 illustrate an aspect of the swingable frames 138<sup>e</sup> and their respective pairs of traction wheels of the auxiliary traction and steering device as applied to a motor vehicle to the rear of the rear main driving wheels 3—3, the omissions shown having been made to point out generally the adaptability to this construction of the types of the device previously described and shown in part in Figs. 17, 28, 31 and 36. The auxiliary frame as before, is adapted to receive the transmission mechanism for elevating or lowering the traction wheels of the auxiliary device of any of the various types hereinbefore described and shown, likewise to receive the mechanism thereof for imparting rotation to last said wheels and to accommodate the steering control mechanism of any of the types referred to. The driven shaft 111<sup>e</sup>, deriving the engine power in a manner similar to that previously pointed out and shown in Figs. 1 and 2, carries that power to the rear of the rear main driving wheels 3—3 for the operation of the auxiliary device. While the swingable frames 138<sup>e</sup>—138<sup>e</sup>, journaled to the respective bearing blocks 132<sup>e</sup>—132<sup>e</sup> and secured by the auxiliary frame to the chassis 1—1, are shown to swing transversely of the vehicle, it is obvious, that with proper modification, the swingable frames may be arranged to operate longitudinally in a manner like that previously described and shown.

In places on the vehicle illustrated, the gear transmission and other parts of the mechanisms are shown exposed; where desirable, a suitable enclosure may be provided to exclude dirt and grit therefrom.

From the foregoing description taken in connection with the drawings, it is apparent that there is provided a novel transmission and steering mechanism for the operation of the front main wheels of a motor vehicle and also a novel auxiliary traction and steering device for such vehicle; and in their practical application with such vehicles either the said mechanisms for the front main wheels or the said auxiliary traction and steering device or both the said mechanisms and the auxiliary device may be employed. It is also seen, that the adjustments for the operation of the transmission and steering mechanisms for the front main wheels 2—2 are independent of those used for the operation of the auxiliary traction and steering device.

The different adjustments for the operation of the auxiliary traction and steering device are substantially as follows:—When it is desired to drive the motor vehicle by the use of this device, the rear main driving wheels 3—3 are disconnected from the power shaft 7 by the clutch mechanism in the casing 80—81. An operator's hand lever connecting to this clutch mechanism through the arm 106 and to the sliding gear 114 through the arm 118, thereby throws the clutch jaws out of operative engagement and enmeshes the sliding gear 114 on the driven shaft 111 with the driving gear 115 on the power shaft 7. By the appropriate hand lever through the shifter rod 162, the sliding gear 156 is brought into enmeshed engagement with either the gear 149 or the reversing gear 150 on the counter shaft 152 according to the direction of rotation of the driven shaft 111, to lower the swingable frames 138—138 into vertical position, the clutch members 197 and 197<sup>a</sup> and the brake bands 197<sup>c</sup> being out of operative engagement. Thus the respective pairs of traction wheels 144 and 145 are brought into engagement with the road surface and at the same time elevate the rear main wheels 3—3 above the road surface, as shown in Figs. 1<sup>A</sup>, 2<sup>A</sup>, 17, 18 and 21, it being understood that, at the beginning of the lowering movement of the respective threaded spindles 179—179, the same are brought into engagement with the nut members 177 by the force of the respective springs 180, the said threaded spindles automatically ending the lowering stroke as previously described, when the threads have passed through the respective nut members 177. When in that position, the springs 180 at the upper end of the threaded spindles 179 constrain the latter against the respective nuts 177 into position for the movement of the threaded spindles in the opposite direction, when the direction of rotation of the nut members 177 is reversed. Coacting through the shafts 186 at each side of the vehicle with the respective swingable frames 138—138, are the hooks 191—191, which bring the rear main wheels 3—3 into linked engagement with the vehicle body, when the latter is being elevated by the auxiliary device. When the swingable frames 138—138 are thus brought into vertical position by the power in the driven shaft 111, the sliding gear member 156 is then slid into inoperative position by the last said hand lever, as shown in Figs. 20 and 21. The driving connection with the respective pairs of traction wheels 144 and 145 may be made by bringing the clutch members 197<sup>a</sup>—197<sup>a</sup> into operative engagement with the respective clutch members 197—197 by the hand lever connecting to the control rods 201—201, the brake bands 197<sup>c</sup>—197<sup>c</sup>, of which the operative means are not shown, being out of operative engagement. When thus adjusted, the power from the engine shaft 7 drives the driven shaft 111 and that in turn drives the said differential mechanism in the casing 151, and finally the respective pairs of traction wheels 144 and 145 through the medium of the transmission mechanisms hereinbefore described and shown, the last said wheels being capable of being driven in any direction as selected. When the operator desires to make a turn of the vehicle on the road surface by the use of the auxiliary traction and steering device, he turns the hand wheel 252, which rotates the auxiliary steering post 247 through the medium of the gear members 250 and 251 and that in turn rotates the steering shaft 222 and the shaft 221 through the cross shaft 231 by the gear transmission mechanism hereinbefore described and shown in Figs. 1, 2, 26 and 27. The extensible shafts 228—228$^a$ connecting at each side to the steering shafts 221 and 222 transmit that rotation to the respective worms 218 on the swingable frames, which impart lateral turning movement to the traction wheels of the auxiliary device in unison in either direction, see Figs. 22 and 23. The operator may, by means of the hand lever 57, through the control rod 243 and shifter member 241, throw the disengaged spur gear of the sliding multiple gear 235 into enmeshed engagement with the nearer multiple gear, which is positioned above it and actuated by the steering shaft 222, and will thereby turn the traction wheels 144 and 145, connected to the steering shaft 221, by the same direction of rotation of the hand wheel 252, in a direction opposite to that obtained before. Thus by this construction the respective pairs of power driven steering wheels 144 and 145, may be operably moved to turn at any angle in unison in one direction, in unison in the opposite direction, the same means imparting turning movement to last said wheels in one swingable frame at any angle in one direction, the said power driven steering wheels in the other swingable frame turning in unison in the reverse direction. By this construction furthermore the steering adjustment may be imparted cumulatively or by reversal of the steering mechanism as desired. It will, therefore, be clearly understood that this device will permit the traction wheels in each frame thereof to be driven at any angle in like direction, in the opposite direction or in alternate directions by the same direction of rotation of the power shaft if desired; it will also permit these traction wheels to be steered to converge forward or backward and be made to turn and drive the vehicle pivotally by the same direction of rotation of the shaft if desired, see Figs. 43 to 57 both inclusive. When the engine is to run loose, the clutch members 197 and the sliding gear member 156 are out of operative engagement; or the sliding gear member 114 alone may be arranged to be slid out of operative engagement.

For the operation of the auxiliary traction and steering device shown in Figs. 11, 12 and 13, wherein the traction wheels thereof are adapted to swing in a direction parallel with the longitudinal axis of the motor vehicle, the different adjustments are substantially like those provided for the operation of the auxiliary device previously described and shown generally in Figs. 1, 1$^A$, 2 and 2$^A$. As before, the rear main driving wheels 3—3 are cut out from the power shaft by a clutch mechanism like that in the casings 80—81 previously described and shown in Figs. 1, 2, 14, 15 and 16 and the driven shaft 111$^a$ is brought into operative engagement with the power shaft of the motor vehicle by an operable control mechanism and gear transmission like that including the driving gear member 115 and the sliding gear member 114 hereinbefore described and shown in Figs. 1 and 2. By the operator's hand lever, through the shifter rod 162$^a$, the sliding gear member 156$^a$ is enmeshed with either the spur gear 149$^a$ or the reversing gear 150$^a$, according to the direction of rotation of the driven shaft 111$^a$, to lower the swingable frames 138$^a$—138$^a$ into vertical position, the clutch members on the transverse shafts 196$^b$ corresponding to those designated 197 and 197$^a$ in Fig. 18 and the brake bands thereon, being out of operative engagement. Thus the respective pairs of traction wheels 144$^a$ and 145$^a$ are brought into engagement with the road surface and at the same time elevate the rear main wheels 3—3 above the road surface. The gear transmission mechanism in the housings 165$^b$—165$^b$ for elevating and lowering the respective pairs of traction wheels 144$^a$ and 145$^a$, operates in a manner substantially like that previously described and shown generally in Figs. 1$^A$ and 2$^A$. Here also the hooks 191$^a$—191$^a$, coacting with the swingable frames 138$^a$—138$^a$ through the respective shafts 186$^a$ bring the rear main wheels 3—3 into linked engagement with the vehicle body, when the latter is being elevated by this auxiliary device. By reference to Figs. 11, 12 and 13 it will be seen, that the mechanism for imparting rotation to the respective pairs of traction wheels 144$^a$ and 145$^a$, is controlled and operates in a manner substantially like that hereinbefore described and shown generally in Figs. 1$^A$ and 2$^A$ and also in Figs. 18, 19, 20, 22 and 23. The steering control mechanism for the auxiliary device shown in Figs. 11, 12 and 13 is also controlled and operates in a manner substantially like that previously described and shown generally in Figs. 1, 1$^A$, 2 and 2$^A$. The adjustments provided to enable the engine to run loose in connection with this auxiliary traction and steering device, are like those hereinbefore described and shown generally in Figs. 1, 1$^A$, 2 and 2$^A$.

The different adjustments for the operation of the auxiliary traction and steering device shown in Figs. 28, 29 and 30, are also substantially like those provided in the auxiliary device previously described and shown generally in Figs. 1, 1$^A$, 2 and 2$^A$. The rear main driving wheels 3—3 are cut out from the power shaft of the motor vehicle by a clutch mechanism like that in the casing 80—81, previously described and shown in Figs. 1, 2, 14, 15 and 16, the said clutch mechanism being provided with controls leading to an operator's hand lever. The driven shaft 111$^b$ is brought into operative engagement with the power shaft by an operable control mechanism and gear transmission like that including the driving gear member 115 and the sliding gear member 114, hereinbefore described and shown in Figs. 1 and 2. By the operator's hand lever, through the shifter rod 162$^b$, the sliding gear member 156$^b$ is enmeshed with either the gear 149$^b$ or the reversing gear 150$^b$, according to the direction of rotation of the driven shaft 111$^b$, to lower the swingable frame 138$^b$—138$^b$, through the gear member 155$^b$ and the enmeshed threaded spindle transmission mechanism connected therewith, into vertical position, hereinbefore explained—the clutch members on the transverse shafts 196$^c$ corresponding to those designated 197 and 197$^a$ in Fig. 18 and the brake bands thereon, being out of operative engagement. Thus the respective pairs of traction wheels 144$^b$ and 145$^b$ are brought into engagement with the road surface and at the same time elevate the rear main wheels 3—3 above the road surface. It will be seen in Figs. 28 and 29, that the carriage plate 285 at the beginning of each reciprocation up or down, is brought into engagement with the thread of the spindle 281 by the force of the springs 288, the said carriage plate automatically ending each reciprocation, as previously described, when the same has completely passed over the spindle thread. When the carriage plate is carried to the lower end of the threaded spindle, the link transmission mechanism actuated thereby has brought the swingable frames and their traction wheels 144$^b$ and 145$^b$ in the position shown in full lines in Fig. 28. The swingable frames 138$^b$—138$^b$ actuate each a coacting mechanism, providing each a hook corresponding to those designated 190 and shown in Figs. 1$^A$ and 2$^A$, for bringing the rear main wheels 3—3 into linked engagement with the vehicle body, when the latter is being elevated by this auxiliary device. When the swingable frames are thus brought into vertical position by the power in the driven shaft 111$^b$, the sliding gear member 156$^b$ is then slid into inoperative position by the appropriate hand lever, as shown in Fig. 29. The mechanism for imparting rotation to the respective pairs of traction wheels 144$^b$ and 145$^b$, is controlled and operates in a manner substantially like that, hereinbefore described and shown generally in Figs. 1$^A$ and 2$^A$ and also in Figs. 18, 19, 20, 22 and 23. The steering control mechanism for the auxiliary device shown in Figs. 28, 29 and 30, is also controlled and operates in a manner substantially like that previously described and shown generally in Figs. 1, 1$^A$, 2 and 2$^A$. The adjustments provided to enable the engine to run loose in connection with this auxiliary traction and steering device, are like those hereinbefore described and shown generally in Figs. 1, 1$^A$, 2 and 2$^A$.

The different adjustments for the operation of the auxiliary traction and steering device shown in Figs. 31, 32, 33, 34 and 35, are again substantially like those provided in the auxiliary device previously described and shown generally in Figs. 1, 1$^A$, 2 and 2$^A$. The rear main driving wheels 3—3 are cut out from the power shaft of the motor vehicle by a clutch mechanism like that in the casing 80—81 previously described and shown in Figs. 1, 2, 14, 15 and 16, the said clutch mechanism being provided with controls leading to an operator's hand lever. The driven shaft 111$^c$ is brought into operative engagement with the power shaft by an operable control mechanism and gear transmission like that including the driving gear member 115 and the sliding gear member 114, hereinbefore described and shown in Figs. 1 and 2. By an appropriate hand lever through the shifter rod 162$^c$, the sliding gear member 156$^c$ is enmeshed with either the gear 149$^c$ or the reversing gear 150$^c$, according to the direction of rotation of the driven shaft 111$^c$, to lower the swingable frames 138$^c$—138$^c$, through the gear member 155$^c$ and the enmeshed threaded spindle transmission mechanism connected therewith, into vertical position, as hereinbefore explained—the clutch members on the transverse shafts 196$^d$ corresponding to those designated 197 and 197$^a$ in Fig. 18 and the brake bands thereon, being out of operative engagement. Thus the respective pairs of traction wheels 144$^c$ and 145$^c$ are brought into engagement with the road surface and at the same time elevate the rear main wheels 3—3 above the road surface. It will be seen in Figs. 31 and 33, that the rider mechanism 308 on the respective transversely aligned threaded spindles 303 at the beginning of each reciprocation inward and outward, are brought into engagement with the thread of the respective spindles 303 by the force of the springs 311, the said rider mechanisms 308 automatically ending each reciprocation as previously described, when the same have completely passed over the respective spindle threads. When the rider mechanisms are carried to the outer end of the respective threaded spindles by the rotation of said spindles, the lever arm and gear transmission mechanisms actuated thereby, have brought the swingable frames and their traction wheels 144$^c$ and 145$^c$, in the position shown in full lines in Fig. 31. The swingable frames 138$^c$—138$^c$ each actuate a coacting mechanism providing each a hook corresponding to those designated 190 and shown in Figs. 1ᴬ and 2ᴬ, for bringing the rear main wheels 3—3 into linked engagement with the vehicle body, when the latter is being elevated by this auxiliary device. When the swingable frames are thus brought into vertical position by the power in the driven shaft 111c, the sliding gear member 156ᵉ is then slid into inoperative position by the appropriate hand lever as shown in Fig. 29. The mechanism for imparting rotation to the respective pairs of traction wheels 144ᶜ and 145ᶜ, is controlled and operates in a manner substantially like that hereinbefore described and shown generally in Figs. 18, 19, 20, 22 and 23. The steering control mechanism for the auxiliary device shown in Figs. 31, 32, 33, 34 and 35, is also controlled and operates in a manner substantially like that previously described and shown generally in Figs. 1, 1ᴬ, 2 and 2ᴬ. The adjustments provided to enable the engine to run loose in connection with this auxiliary traction and steering device, are like those hereinbefore described and shown generally in Figs. 1, 1ᴬ, 2 and 2ᴬ.

The different adjustments for the operation of the auxiliary traction and steering device shown in Figs. 36, 37, 38, 39, 40, 41 and 42, are also substantially like those provided in the auxiliary device previously described and shown generally in Figs. 1, 1ᴬ, 2 and 2ᴬ. The rear main driving wheels 3—3 are cut out from the power shaft of the motor vehicle by a clutch mechanism like that in the casing 80—81 previously described and shown in Figs. 1, 2, 14, 15 and 16, the said clutch mechanism being provided with controls leading to an operator's hand lever. The driven shaft 111ᵈ is brought into operative engagement with the power shaft by an operable control mechanism and gear transmission like that including the driving gear member 115 and the sliding gear member 114 hereinbefore described and shown in Figs. 1 and 2. By an appropriate hand lever through the shifter rod 162ᵈ, the sliding gear member 156ᵈ is enmeshed with either the gear 149ᵈ or the reversing gear 150ᵈ, according to the direction of rotation of the driven shaft 111ᵈ, to lower the swingable frames 138ᵈ—138ᵈ, through the gear member 155ᵈ and the enmeshed worm and gear transmission mechanism connected therewith, into vertical position, as hereinbefore explained—the clutch members on the transverse shafts 196ᵉ corresponding to those designated 197 and 197ᵃ in Fig. 18 and the brake bands thereon, being out of operative engagement. Thus the respective pairs of traction wheels 144ᵈ and 145ᵈ are brought into engagement with the road surface and at the same time elevate the rear main wheels 3—3 above the road surface. It will be seen in Fig. 36, that the pairs of clutch members at the outer end or inner end of the respective hollow worms 336, are brought into engagement with said worms by the bell crank transmission mechanisms actuating the shifter rods 359 at the end of each oscillation of the swingable frames 138ᵈ—138ᵈ, the said pair of outer clutch members or inner clutch members automatically coming out of operative engagement as previously described, when the respective swingable frames complete their upward or downward movement. Thus the swingable frames 138ᵈ shown in full lines in Fig. 36, have brought the pair of outer clutch members out of operative engagement from the respective hollow worms 336 through the medium of the said bell crank transmission mechanism at the end of the downward movement of the swingable frames, at the same time engaging the pair of inner clutch members with the respective worms at the opposite ends thereof. The swingable frames 138ᵈ—138ᵈ each actuate a coacting mechanism providing each a hook corresponding to those designated 190, hereinbefore described and shown in Figs. 1ᴬ and 2ᴬ, for bringing the rear main wheels 3—3 into linked engagement with the vehicle body, when the latter is being elevated by this auxiliary device. When the swingable frames are thus brought into vertical position by the power in the driven shaft 111ᵈ, the sliding gear member 156ᵈ, is then slid into inoperative position by the appropriate hand lever as shown in Fig. 29. The mechanism for imparting rotation to the respective pairs of traction wheels 144ᵈ and 145ᵈ is controlled and operates in a manner substantially like that hereinbefore described and shown generally in Figs. 18, 19, 20, 22 and 23. The steering control mechanism for the auxiliary device shown in Figs. 36, 37, 38, 39, 40, 41 and 42, is also controlled and operates in a manner substantially like that previously described and shown generally in Figs. 1, 1ᴬ, 2 and 2ᴬ. The adjustments provided to enable the engine to run loose in connection with this auxiliary traction and steering device, are like those hereinbefore described and shown generally in Figs. 1, 1ᴬ, 2 and 2ᴬ.

The different adjustments for the operation of the transmission and steering mechanisms for the front main wheels 2—2 are substantially as follows:—When it is desired to drive the motor vehicle alone by the use of the combined transmission and steering mechanism as applied to the front main wheels 2—2, the rear main wheels 3—3 are disconnected from the power shaft 7 by the clutch mechanism in the casing 80—81, see Figs. 1 and 2. As was previously explained, the control mechanism for bringing the sliding gears 32—32 of the front wheel-drives into operative engagement with the transmission mechanism, is operable through the steering control by the cam member 38, as shown best in Fig. 4, adapting this shifter mechanism to become effective for such angular positions of the front wheels 2—2, as may be selected. And it is obvious that the sliding gear members 32—32 and therefore the wheels 2—2 will receive the engine power for larger or smaller angular changes of these steering wheels according as the cam members 37 are shaped. Thus, when the sliding gears 32—32 are in operative engagement, the manner of operating the front main wheels 2—2 is substantially as follows:—

*Drive forward.*—By the operator's hand lever connecting to the arm 11$^f$ the clutch 11 is applied to the coacting clutch member 11$^a$, the brake band 11$^b$ being out of operative engagement; the cross arm 47 is actuated by the hand lever through rod 51, thereby enmeshing the right hand side gear 23 with the forward gear 22 and the left hand gear 23 with the rearward gear 22 from the position shown in Fig. 7. When thus adjusted, the power from the engine shaft drives the transmission mechanism in the casing 9—9$^a$, the multiple gear mechanism, the transverse power shafts and the front wheel-drives, driving the vehicle in the direction of the lower arrow head indicated in the diagram Fig. 43. It is understood that by the reversal of the cross arm 47, reversing the positions of the gears 23—23, a drive backward is provided for.

*A right hand turn, wheels converging forward.*—From the position shown in Fig. 2, the left end of the cross steering rod 65 is moved along the reversing arm 63 to the rear end thereof by the handle 73$^a$ of the control rack 73. By turning the hand wheel 78, the lever arm 74 is turned rearward thus converging the front wheels 2—2 forward to a position like that indicated in the diagram Fig. 52. The front wheels can be turned to such convergence that their axes will intersect the rear axle of the vehicle at a point midway between the rear wheels. Under this condition all the wheels can be made to rotate about a vertical axis through said midway point. By the hand lever connecting to the arm 11$^f$, clutch 11 is applied to the coacting clutch member 11$^a$, the brake band 11$^b$ being out of operative engagement; from the position shown in Fig. 7 the cross arm 47 is actuated axially along the shaft 41 by the nut member 43 through the rod 52, thereby enmeshing both gear members 23 with the rearward gear member 22. When thus adjusted, the power from the engine shaft drives the transmission mechanism in the casing 9—9$^a$, the multiple gear mechanism, the transverse power shafts and the front wheel-drives, driving the vehicle in the direction of the left arrow head indicated in the diagram Fig. 52. By actuating the cross arm 47 axially on shaft 41 in the reverse direction, thereby enmeshing the gear members 23—23 with the forward gear member 22, a left hand turn is provided for.

*A right hand turn, the front wheels adjusted to drive in alternate directions.*—By adjusting the driving transmission mechanism as just described and the wheels 2—2 directed forward, the provision is made for driving said wheels in alternate directions, whereby a right hand turn or left hand turn may be imparted to the motor vehicle as hereinafter referred to, when the rear part of the vehicle rests on the wheels of the auxiliary traction and steering device, which are arranged to converge backward in a position like that indicated in the diagram Fig. 53, wherein all wheels bearing on the road surface are arranged to rotate about the same axis.

*A right hand turn, one front wheel having a driving connection and one front wheel running loose.*—By the operator's hand lever connecting to the arm 11$^f$, the clutch 11 is applied to the coacting clutch member 11$^a$, the brake band 11$^b$ being out of operative engagement; from the position shown in Fig. 7 and actuated by the cross arm 47 either through the rod 51 or the rod 52, the right hand side gear member 23 is enmeshed with the forward gear member 22 and driving the wheel 2 at that side—the wheel 2 at the opposite side running loose, it being cut out by the action of the cam 37; or, the left hand side gear member 23 is enmeshed with the rearward gear member 22 and driving the wheel 2 at that side—the wheel 2 at the apposite side running loose, it being cut out by the action of the cam 37. By turning the hand wheel 78, the wheels 2—2 may be turned in unison through the transverse movement of the cross rod 65, the latter being positioned at the forward end of the reversing arm 63. When thus adjusted, the power from the engine shaft drives either wheel 2 as selected, through the transmission mechanism previously described. By a reversal of said parts, a left hand turn is provided for, see the diagrams Figs. 44 and 45.

When the engine is to run loose, the clutch 11 is brought out of operative engagement or the movable gear members 23—23 may be brought out of operative engagement or both the former and the latter are out of operative engagement, see Fig. 7.

By combining the use of the auxiliary traction and steering device and the transmission and steering mechanisms of the front main wheels, as applied to a motor vehicle and by arranging these mechanisms to operate in a manner, whereby they may be made cooperative, movements may be imparted to the motor vehicle permitting it to travel forward, backward or sidewise at any angle in either direction, to turn in any direction or to rotate pivotally in either direction, the said movements being made directly from a state of rest, as indicated in the diagrams Figs. 43 to 57 both inclusive.

Having thus described my invention and explained its manner of construction and use, what I claim is:—

1. A motor vehicle having traction wheels, supplemental traction elements pivotally mounted on the frame of the vehicle substantially adjacent said wheels, a screw pivotally connected to each of said elements, a power driven rotatable member corresponding to each screw, a nut adapted to engage said screw, said nut being universally mounted upon said rotatable member, whereby when said members are rotated, said elements are swung relatively to the frame of the vehicle for elevating the wheels.

2. In a motor vehicle comprising a body and a plurality of pairs of wheels for supporting said body upon the roadway, supplemental dirigible traction devices for elevating a pair of said wheels, each traction device comprising a frame relatively movable to the body of the vehicle, a pair of wheels mounted on a common axle in the lower portion of said frame, one of said latter wheels being fixed to the axle while the other is loosely mounted thereon, the mounting of the axle in said frame permitting rotation of said axle about a vertical axis, steering means for rotating said axle about its vertical axis, and power means geared to said axle for rotating said axle about its longitudinal axis.

3. In a motor vehicle, a supplementary dirigible traction device for raising said vehicle, comprising a frame relatively movable to the body of the vehicle, a sleeve rotatably mounted upon said frame, an axle rotatably mounted in a lower projecting portion of said sleeve, a wheel fixed upon said axle for supporting said frame from the roadway, a shaft rotatably mounted within said sleeve having its longitudinal axis substantially perpendicular to the longitudinal axis of said axle, said shaft being geared to said axle for driving same and a manually operable steering shaft geared to said sleeve for rotating same.

4. In a motor vehicle, a supplementary dirigible traction device, for elevating said vehicle from the roadway, comprising a frame, a power transmission shaft extending transversely of the body of the vehicle and supported thereon, said frame being rotatably mounted near its upper end upon said body in axial alignment with said shaft, a sleeve rotatably mounted upon said frame with its longitudinal axis perpendicular to said shaft, an axle rotatably mounted in a lower projecting portion of said sleeve, the longitudinal axis of the axle being substantially perpendicular to the longitudinal axis of said sleeve, a wheel fixed upon said axle for supporting said frame from the roadway, a driving shaft, rotatably mounted within said sleeve, geared at one end to the power transmission shaft and at the other end to the axle, and a manually operable steering shaft geared to said sleeve for rotating same.

5. In a motor vehicle, a pair of supplementary dirigible traction devices, one located on each side of the vehicle, means for moving said devices relatively to the body of the vehicle for elevating same from the roadway, means for effecting tractive rotation of a portion of said devices for driving the vehicle, each of said devices being mounted upon said vehicle for rotation about a vertical steering axis, a pair of substantially horizontal shafts mounted upon said vehicle and extending substantially longitudinally of same, one end of each shaft being geared to one of said devices for rotating same about its steering axis, another shaft extending transversely of the vehicle permanently geared to the other end of one of said longitudinal shafts, the second longitudinal shaft extending from its corresponding traction device past said transverse shaft, a steering post geared to said second shaft, substantially at its other end, a nest of reversing gears associated with said second shaft opposite said transverse shaft, shift gears slidably mounted upon the transverse shaft but fixed against relative rotation thereto, said shift gears being located adjacent to said nest of gears, and engageable with same, and means for shifting said shift gears into varying engagement with the gears of said nest or out of engagement therewith, for varying the direction of rotation of said transverse shaft or to permit it to remain stationary when said second shaft is rotated, whereby said traction devices can be steered in parallelism, into opposite steering directions to each other or reversed in respect to each other.

6. A motor vehicle having traction wheels, supplemental dirigible traction elements pivotally mounted on the frame of the vehicle substantially adjacent said wheels, mechanism engaging said traction elements adapted when rotated to swing said traction elements about their pivots for raising or lowering said traction wheels with respect to the roadway, said traction elements having wheels mounted in their lower portions, differential mechanism for rotating said traction elements for driving the vehicle, a power driven shaft, running longitudinally of the vehicle, geared to the master gear of the wheels of said differential mechanism for rotating same, and a nest of reversing gears associated with said shaft adapted to variously engage said mechanism for swinging said traction elements.

7. A motor vehicle having a pair of traction wheels, a pair of supplemental dirigible traction elements pivotally mounted, on the frame of the vehicle substantially adjacent said wheels, to turn on a horizontal axis and on a steering axis, such latter axis being substantially perpendicular to said horizontal axis, a pair of manually rotatable shafts, for steering said traction elements about said perpendicular axis, mounted in bearings on the vehicle, a shaft for each traction element, a universal joint connection from each shaft to its corresponding traction element for transmitting the rotation of the shafts to the traction elements, and a power driven shaft for swinging said traction elements about said horizontal axis for raising and lowering the vehicle, said universal connections permitting the connection of the steering shafts to the traction elements in various positions.

8. A motor vehicle having a pair of traction wheels, a pair of supplemental dirigible traction elements pivotally mounted, on the frame of the vehicle substantially adjacent said wheels, to turn on a horizontal axis and on a steering axis, such latter axis being substantially perpendicular to said horizontal axis, a power driven shaft for swinging said traction elements about said horizontal axis for raising and lowering the vehicle, and universally jointed mechanism mounted on the frame of the vehicle for steering said traction elements about said perpendicular axis, the universal jointing of said mechanism permitting its operative connection to said traction elements in various positions.

9. A motor vehicle having rear traction wheels, supplemental dirigible traction elements pivotally mounted on the frame of the vehicle substantially adjacent said wheels, mechanism engaging said elements for swinging said elements about their pivots for raising or lowering said traction wheels with respect to the roadway, said elements having wheels mounted in their lower portions, differential mechanism for rotating the wheels of said elements for driving the vehicle, a power driven shaft running longitudinally of the vehicle and geared to the master gear of said differential mechanism for rotating same, said power driven shaft continuing toward the rear of the vehicle past said differential mechanism, and a nest of reversing gears associated with the rear portion of said shaft adapted to variously engage said mechanism for swinging said traction elements.

10. In a motor vehicle, a supplementary dirigible traction device for elevating said vehicle from the roadway, comprising a frame pivotally mounted at its upper end upon the body of the vehicle, a power transmission shaft mounted upon the body of the vehicle, a sleeve rotatably mounted upon said frame with its longitudinal axis perpendicular to said shaft, an axle mounted in the lower portion of said sleeve, the longitudinal axis of the axle being substantially perpendicular to the longitudinal axis of said sleeve, a wheel mounted upon said axle for supporting said frame from the roadway, a driving shaft, rotatably mounted within said sleeve, geared at one end to the power transmission shaft and at the other to drive said wheel, and a steering shaft geared to said sleeve for rotating same.

11. In a motor vehicle, a pair of supplementary dirigible traction devices, one located on each side of the vehicle, means for moving said devices relatively to the body of the vehicle for elevating same from roadway, means for effecting tractive rotation of a portion of said devices for driving the vehicle, each of said devices being mounted upon said vehicle for rotation about a vertical steering axis, a pair of shafts mounted upon said vehicle extending substantially longitudinally of same, each shaft being geared to one of said devices for rotating same about its steering axis, a steering post geared to one of said shafts, a nest of reversing gears associated with both of said shafts, and manually operable means for shifting the reversing gears relatively to each other for effecting varying engagement between said shafts, whereby said second shaft may be rotated in the same or opposite direction to the first shaft or be disconnected therefrom.

12. In a motor vehicle a supplemental dirigible traction device comprising a frame relatively movable to the body of the vehicle for raising said vehicle, a pair of wheels rotatably mounted in spaced relation on a common axis in the lower portion of said frame, said mounting enabling said latter wheels to roll upon the roadway when the frame is lowered, the mounting of said latter wheels in said frame permitting rotation of their common axis about another axis, perpendicular to said common axis, steering means for rotating said wheels about said perpendicular axis, and power means connected to one of said latter wheels for rotating it about said common axis, the other of said wheels being losely mounted.

13. A motor vehicle having a pair of traction wheels, supplemental traction elements pivotally mounted on the frame of the vehicle substantially adjacent said wheels, a screw pivotally connected to each of said elements, a power driven ring gear, rotatably mounted upon the vehicle, corresponding to each screw, said screws passing through the openings in their corresponding gears, a nut encircling each screw, each nut being universally mounted upon its corresponding gear, whereby when said gears are rotated, said elements are swung relatively to the frame of the vehicle for elevating the traction wheels.

In testimony whereof I have signed my name to this specification.

FREDERICK B. BARSHELL.